(12) United States Patent
Perner

(10) Patent No.: US 9,328,765 B2
(45) Date of Patent: May 3, 2016

(54) SNAP HOOK

(71) Applicant: D B Industries, LLC, Red Wing, MN (US)

(72) Inventor: Judd J. Perner, Red Wing, MN (US)

(73) Assignee: D B Industries, LLC, Red Wing, MN (US)

( * ) Notice: Subject to any disclaimer, the term of this patent is extended or adjusted under 35 U.S.C. 154(b) by 0 days.

(21) Appl. No.: 14/264,564

(22) Filed: Apr. 29, 2014

(65) Prior Publication Data

US 2014/0230199 A1    Aug. 21, 2014

Related U.S. Application Data

(63) Continuation of application No. 13/777,287, filed on Feb. 26, 2013, now Pat. No. 8,752,254.

(60) Provisional application No. 61/604,141, filed on Feb. 28, 2012.

(51) Int. Cl.
*F16B 45/02* (2006.01)

(52) U.S. Cl.
CPC .............. *F16B 45/02* (2013.01); *Y10T 24/3492* (2015.01); *Y10T 24/4534* (2015.01);
(Continued)

(58) Field of Classification Search
CPC ................ F16B 45/02; Y10T 24/3492; Y10T 24/45257; Y10T 24/45277; Y10T 24/4534; Y10T 24/45361; Y10T 24/45366; Y10T 24/45372
USPC ............... 24/375, 598.1, 599.5, 599.9, 600.1, 24/600.2, 600.8, 601.4
See application file for complete search history.

(56) References Cited

U.S. PATENT DOCUMENTS 370,983 A    10/1887   Stahl
501,875 A    7/1893    Cutter
(Continued)

FOREIGN PATENT DOCUMENTS

DE            42 37 263 A1      7/1994
DE       20 2004 003 899 U1    5/2004
(Continued)

OTHER PUBLICATIONS

"Large Hook & Strap Anchorage Connector—User Instructions", *MSA ROSE*, P/N 10005253, Rev. B, pp. 1-8 (© 1998 Rose Manufacturing Company).

(Continued)

*Primary Examiner* — Robert J Sandy
*Assistant Examiner* — David Upchurch
(74) *Attorney, Agent, or Firm* — IPLM Group, P.A.

(57) ABSTRACT

A snap hook is provided. A body of the snap hook includes a hook shaped mid portion positioned between a nose portion and a connection portion. The body further has an opening to an inner edge that is positioned between the nose end and the connection portion. A gate is pivotally coupled proximate the connection portion of the body. The gate selectively pivots in relation to the body between a closed configuration and an open configuration. A gate holding portion is configured and arranged to be selectively received between at least one wall stop and at least one catch formed by at least one slot in the nose portion of the body to selectively lock the gate in the closed configuration. Moreover, a trigger is further operationally coupled to move the gate holding portion to clear the at least one catch of the nose portion when activated.

17 Claims, 20 Drawing Sheets

(52) U.S. Cl.
CPC ..... *Y10T 24/45257* (2015.01); *Y10T 24/45277* (2015.01); *Y10T 24/45361* (2015.01); *Y10T 24/45366* (2015.01); *Y10T 24/45372* (2015.01)

(56) References Cited

U.S. PATENT DOCUMENTS

| | | | |
|---|---|---|---|
| 705,526 A | 7/1902 | Gray | |
| 741,014 A | 10/1903 | Covert | |
| 761,859 A | 6/1904 | Sweet | |
| 939,727 A | 11/1909 | Maki | |
| 1,062,653 A | 5/1913 | Koons | |
| 1,228,513 A | 6/1917 | Anderson | |
| 1,289,096 A | 12/1918 | Boatright | |
| 1,394,068 A | 10/1921 | Cousins | |
| 1,521,811 A | 1/1925 | Hartbauer | |
| 1,546,208 A | 7/1925 | Cunningham | |
| 1,583,347 A | 5/1926 | Frischknecht | |
| 1,598,684 A | 9/1926 | Jensen | |
| 1,626,866 A | 5/1927 | Neilson | |
| 1,687,006 A | 10/1928 | Cornelius | |
| 1,711,346 A | 4/1929 | Greve | |
| 1,879,168 A | 9/1932 | Freysinger | |
| 1,949,608 A | 3/1934 | Johnson | |
| 1,964,428 A | 6/1934 | Duffy | |
| 2,490,931 A | 12/1949 | Thompson | |
| 2,577,790 A | 12/1951 | McCormick | |
| 3,575,458 A | 4/1971 | Crook, Jr. et al. | |
| 3,918,758 A | 11/1975 | Fournier | |
| 4,062,092 A | 12/1977 | Tamada et al. | |
| 4,122,585 A | 10/1978 | Sharp et al. | |
| 4,279,062 A | 7/1981 | Boissonnet | |
| 4,320,561 A | 3/1982 | Müller et al. | |
| 4,333,212 A | 6/1982 | Bibollet | |
| 4,372,016 A | 2/1983 | La Violette et al. | |
| 4,379,579 A | 4/1983 | Mahan et al. | |
| 4,401,333 A | 8/1983 | Merry | |
| 4,434,536 A | 3/1984 | Schmidt et al. | |
| 4,440,432 A | 4/1984 | Goris | |
| 4,528,728 A * | 7/1985 | Schmidt et al. | 24/599.4 |
| 4,528,729 A | 7/1985 | Schmidt et al. | |
| 4,539,732 A | 9/1985 | Wolner | |
| 4,546,523 A | 10/1985 | Bailey, Jr. | |
| 4,554,712 A | 11/1985 | Le Beon | |
| 4,621,851 A | 11/1986 | Bailey, Jr. | |
| 4,645,255 A | 2/1987 | Zepf | |
| 4,657,110 A | 4/1987 | Wolner | |
| 4,731,910 A | 3/1988 | Purcell et al. | |
| 4,767,144 A | 8/1988 | Hörnberg | |
| 4,908,913 A | 3/1990 | Mori | |
| 4,977,647 A | 12/1990 | Casebolt | |
| 5,002,420 A | 3/1991 | Loyd | |
| 5,174,410 A | 12/1992 | Casebolt | |
| 5,257,441 A | 11/1993 | Barlow | |
| 5,361,464 A | 11/1994 | Bunnell | |
| 5,579,564 A | 12/1996 | Rullo et al. | |
| 5,687,535 A | 11/1997 | Rohlf | |
| 5,694,668 A | 12/1997 | Rohlf | |
| 5,735,025 A | 4/1998 | Bailey | |
| 6,070,308 A | 6/2000 | Rohlf | |
| 6,161,264 A | 12/2000 | Choate | |
| 6,718,601 B1 | 4/2004 | Choate | |
| 6,832,417 B1 | 12/2004 | Choate | |
| 7,437,806 B2 | 10/2008 | Lin | |
| 7,444,723 B2 | 11/2008 | Lin | |
| 7,636,990 B1 * | 12/2009 | Choate | 24/600.1 |
| 7,647,677 B2 | 1/2010 | Casebolt | |
| 8,015,676 B1 | 9/2011 | Choate | |
| 2005/0193531 A1 | 9/2005 | Chang | |
| 2005/0193533 A1 | 9/2005 | Chang | |
| 2008/0022497 A1 | 1/2008 | Thompson | |
| 2008/0022498 A1 * | 1/2008 | Griffith | 24/598.7 |
| 2008/0120818 A1 * | 5/2008 | Belcourt et al. | 24/599.5 |
| 2008/0184540 A1 | 8/2008 | Coulombe | |
| 2008/0185848 A1 | 8/2008 | Coulombe | |
| 2010/0299893 A1 | 12/2010 | Liang | |
| 2011/0175385 A1 | 7/2011 | Buie et al. | |

FOREIGN PATENT DOCUMENTS

| | | |
|---|---|---|
| DE | 202004010008 U1 | 9/2004 |
| DE | 20 2011 103 255 U1 | 10/2011 |
| EP | 0 109 163 A1 | 5/1984 |
| FR | 2.108.918 | 5/1972 |
| FR | 2.146.704 | 3/1973 |
| GB | 798247 | 7/1958 |
| JP | 07 031687 A | 2/1995 |

OTHER PUBLICATIONS

International Search Report from PCT/US2013/028142 mailed Jul. 13, 2013, 5 pages.

* cited by examiner

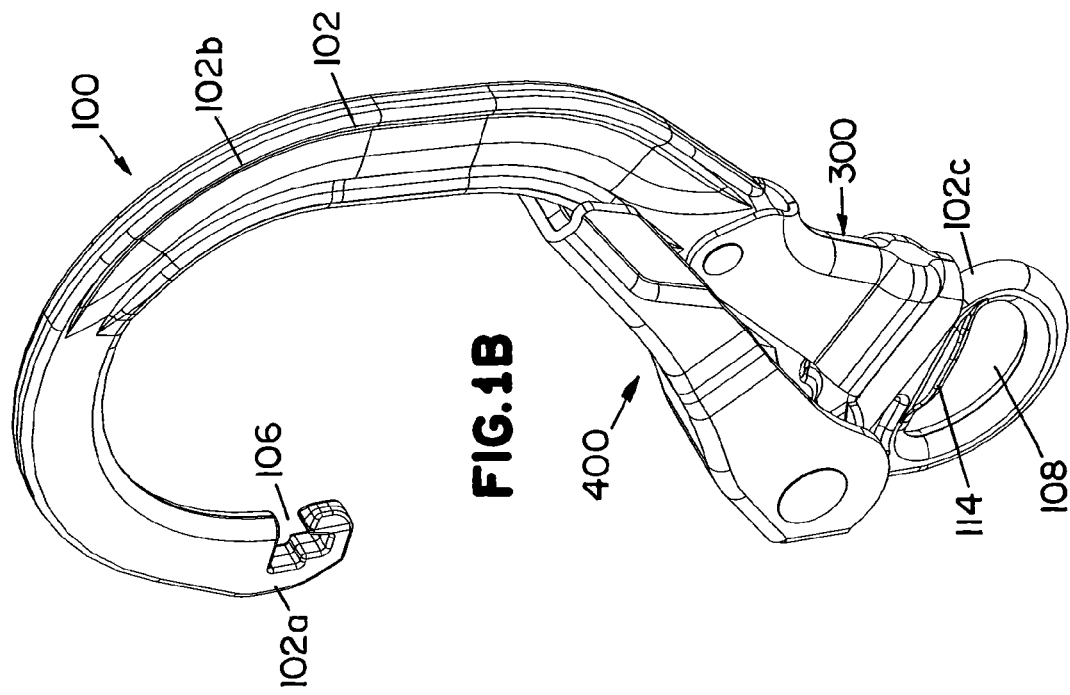
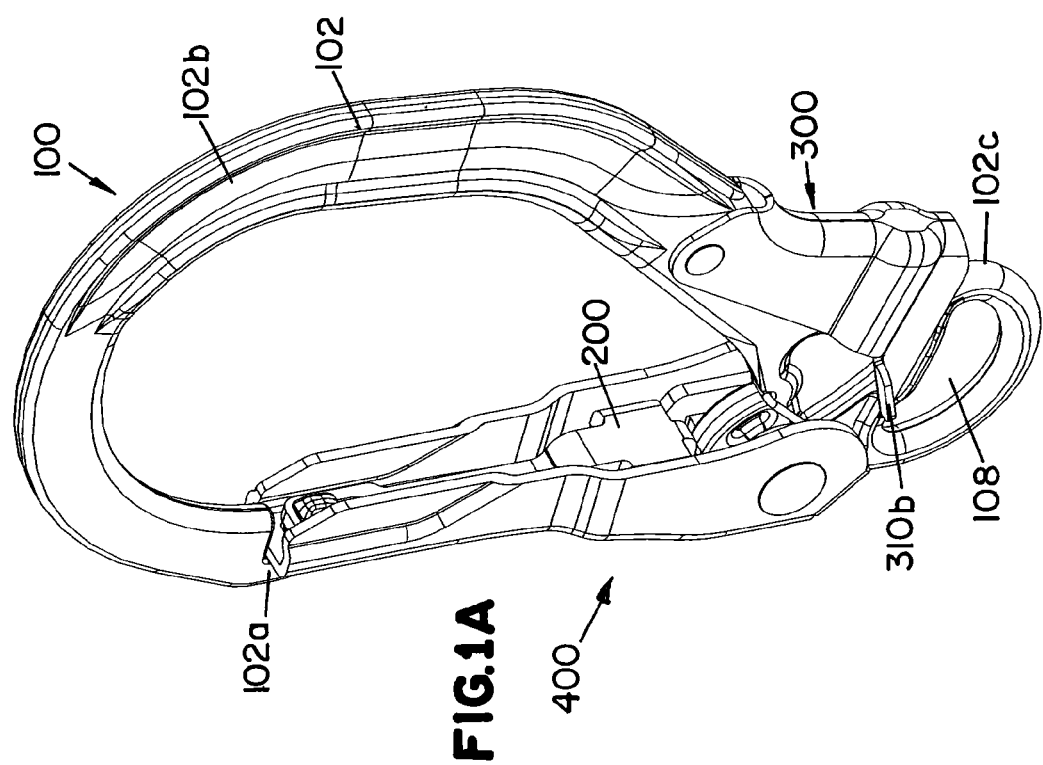

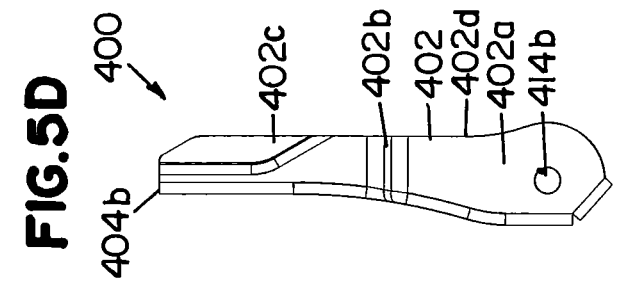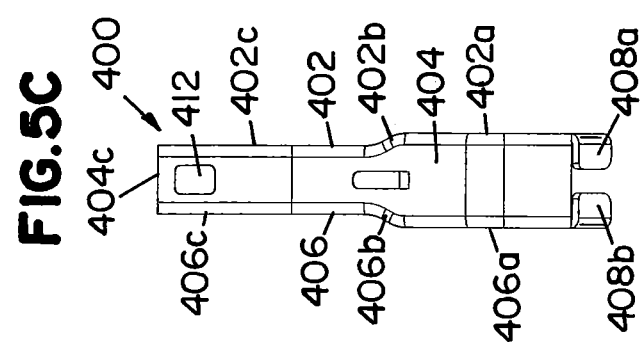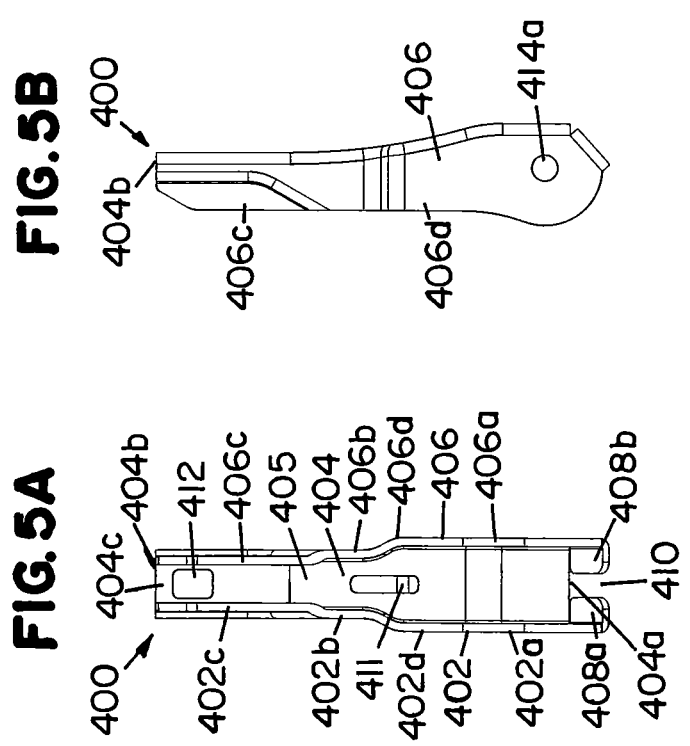

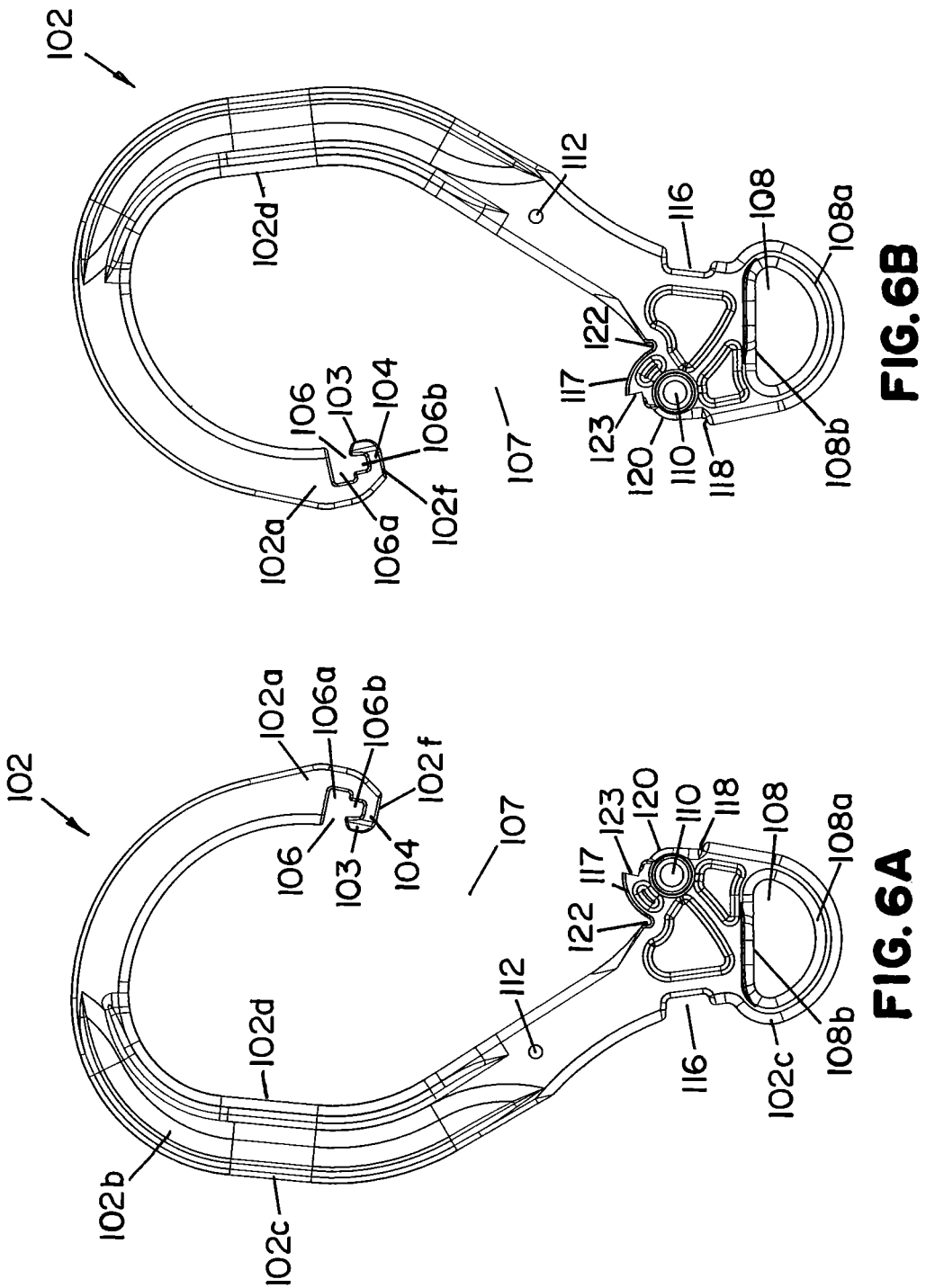

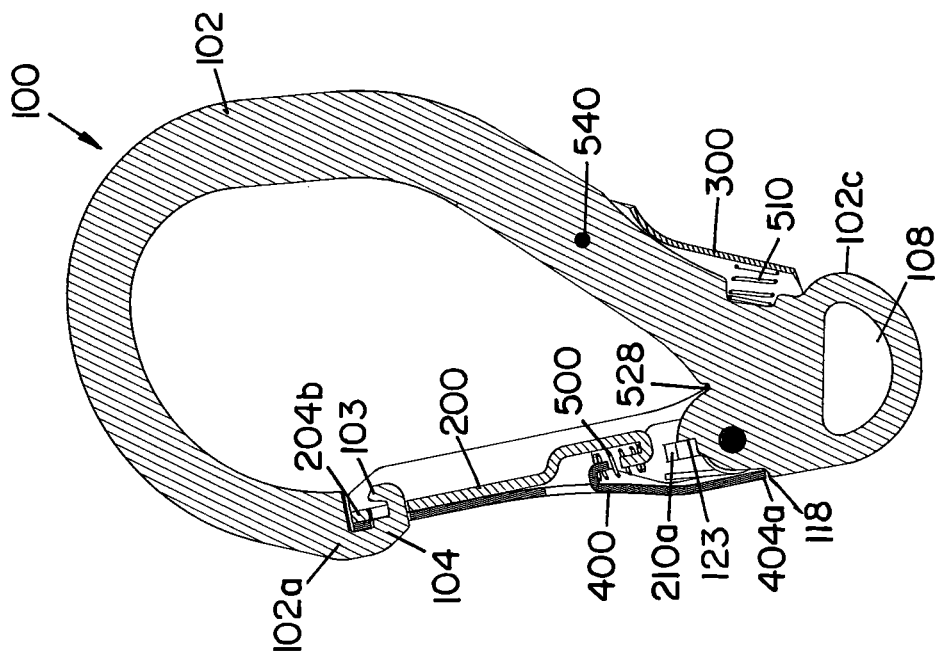
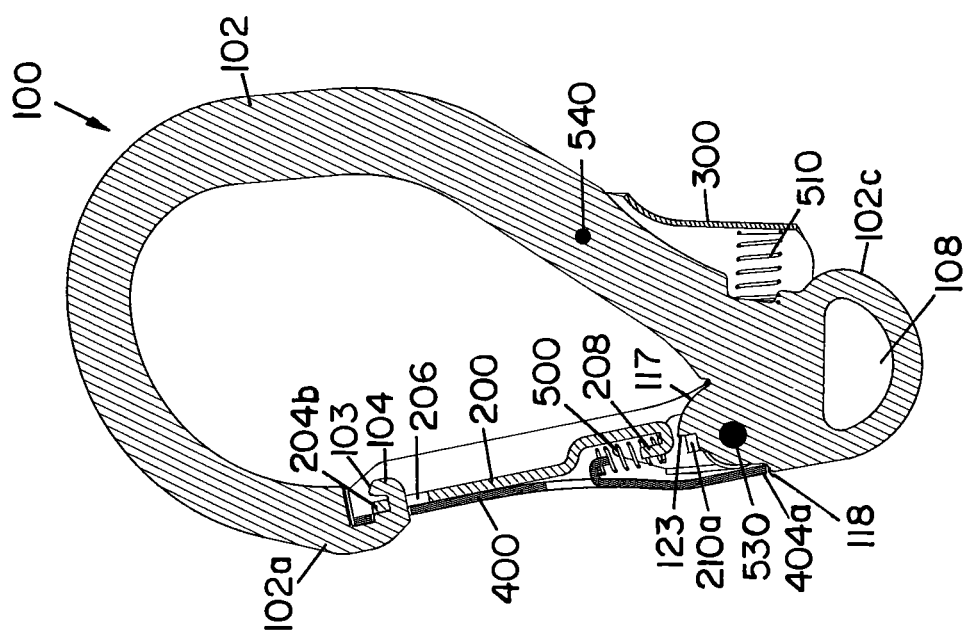

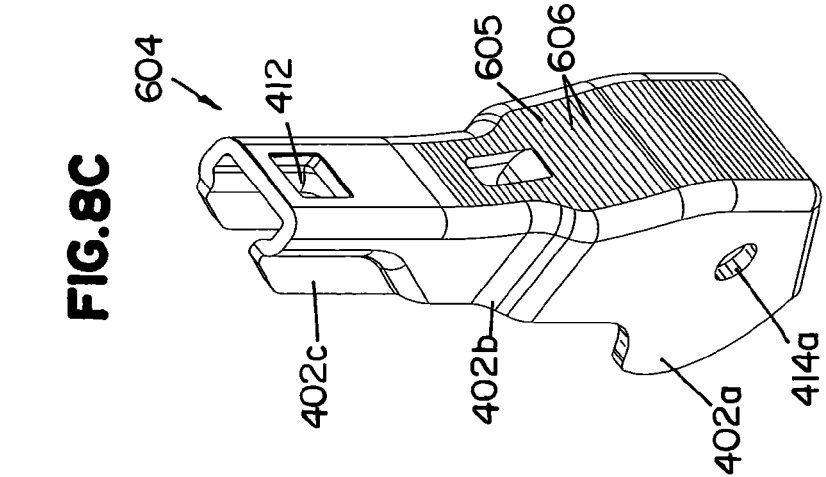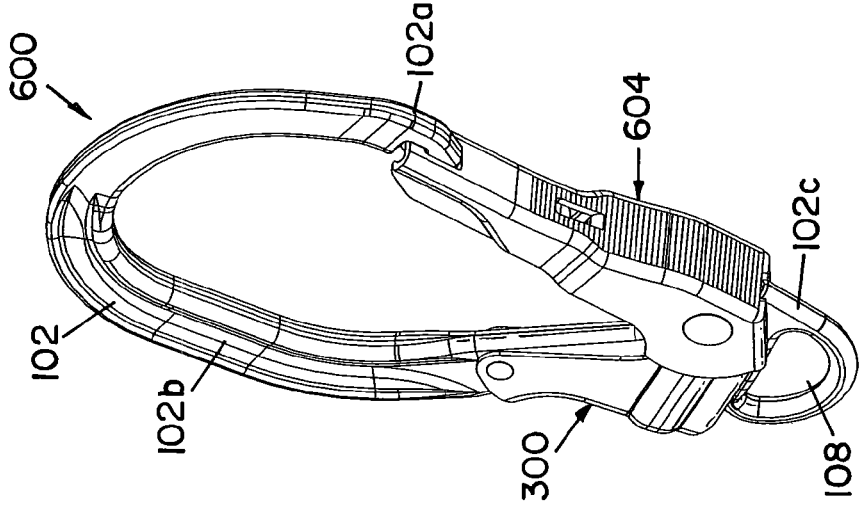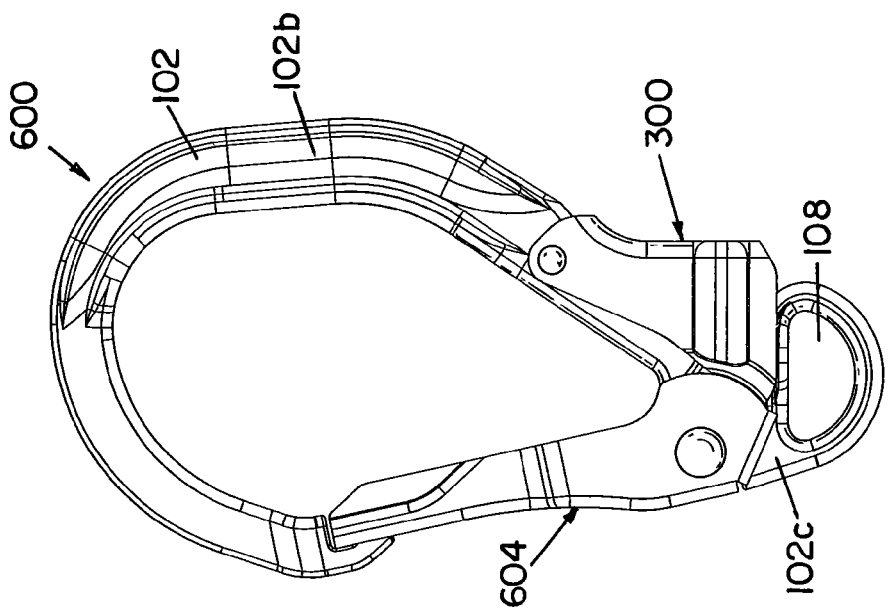

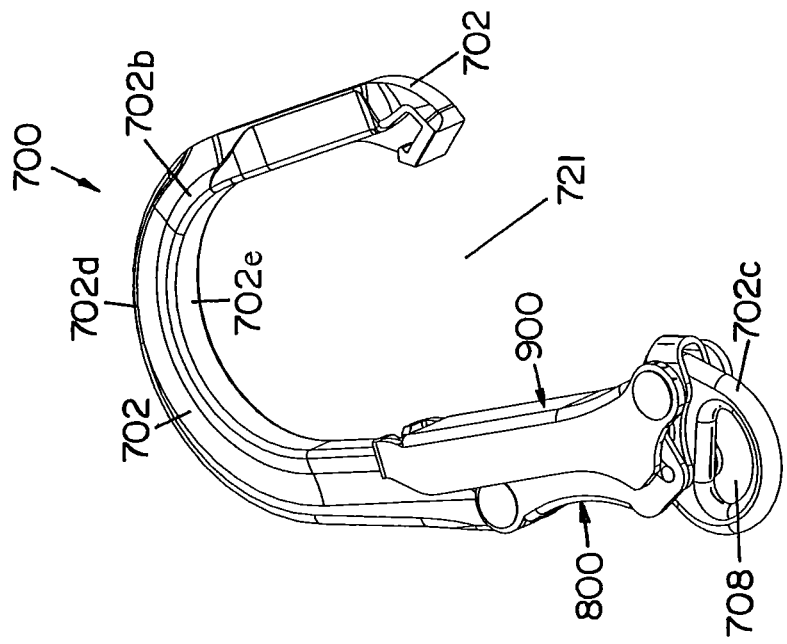
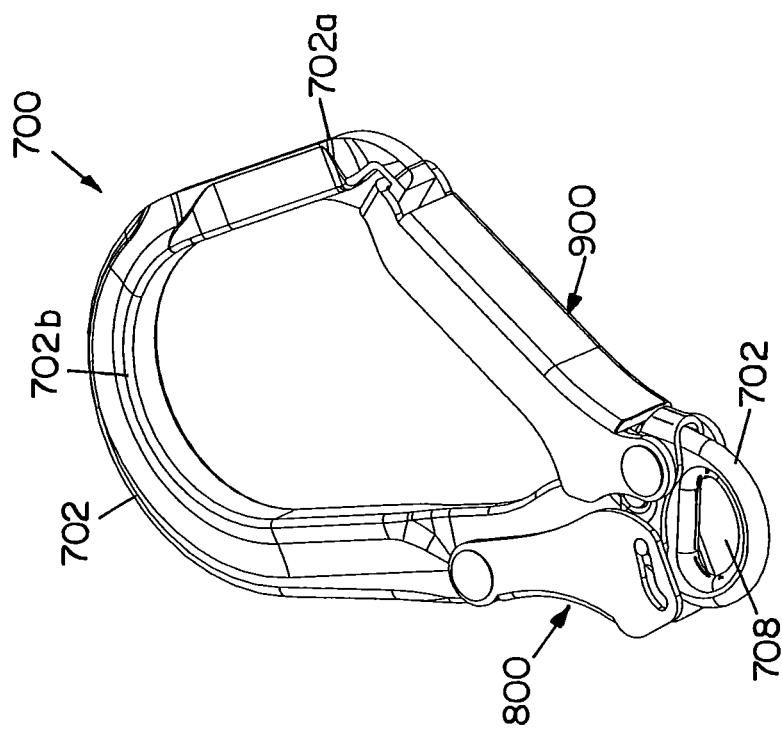

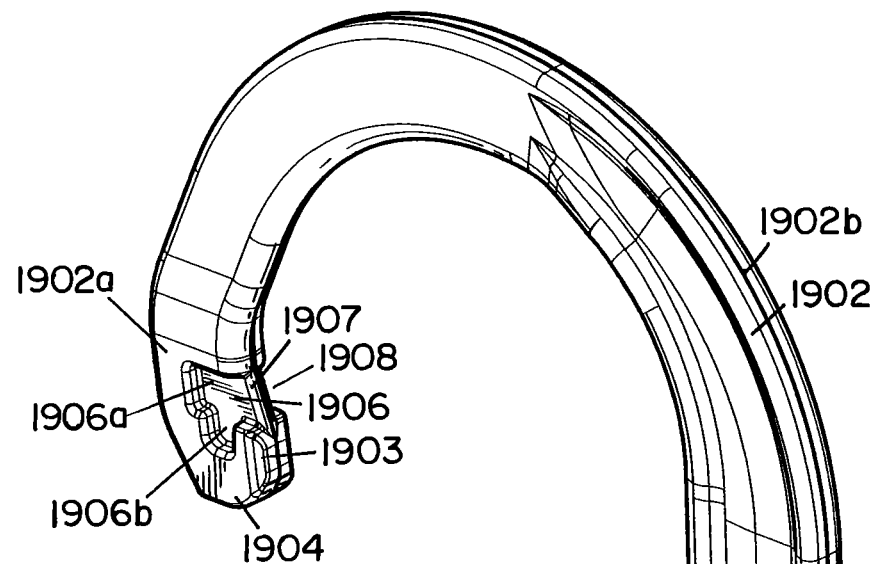
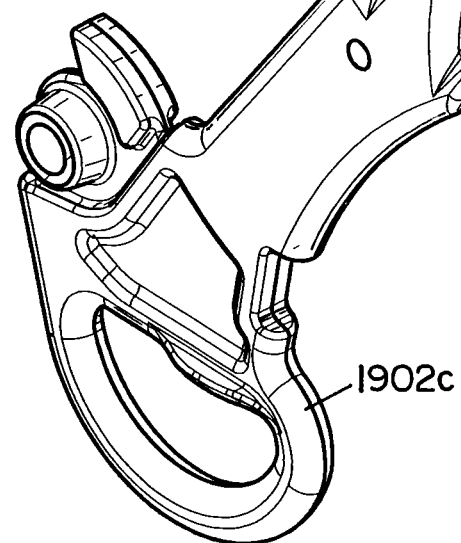
FIG.17

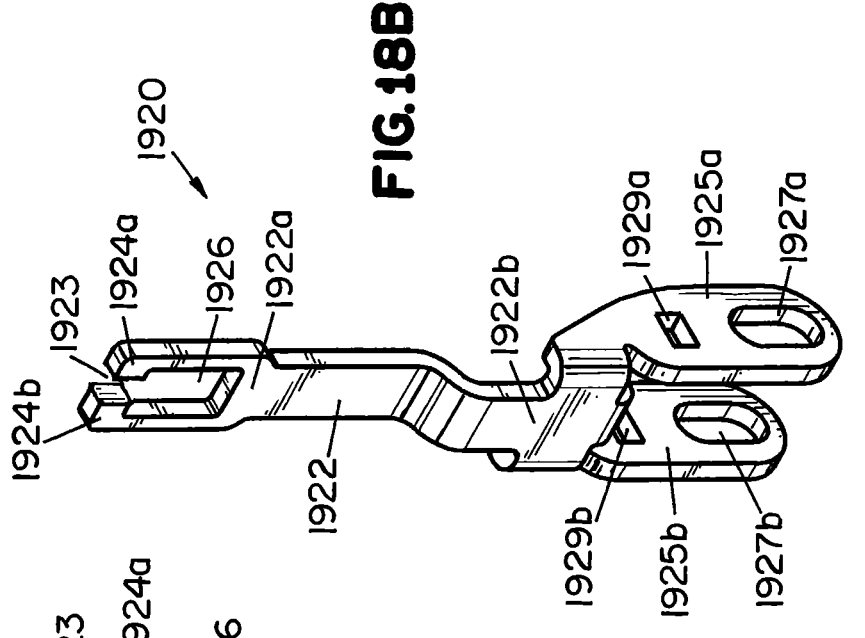
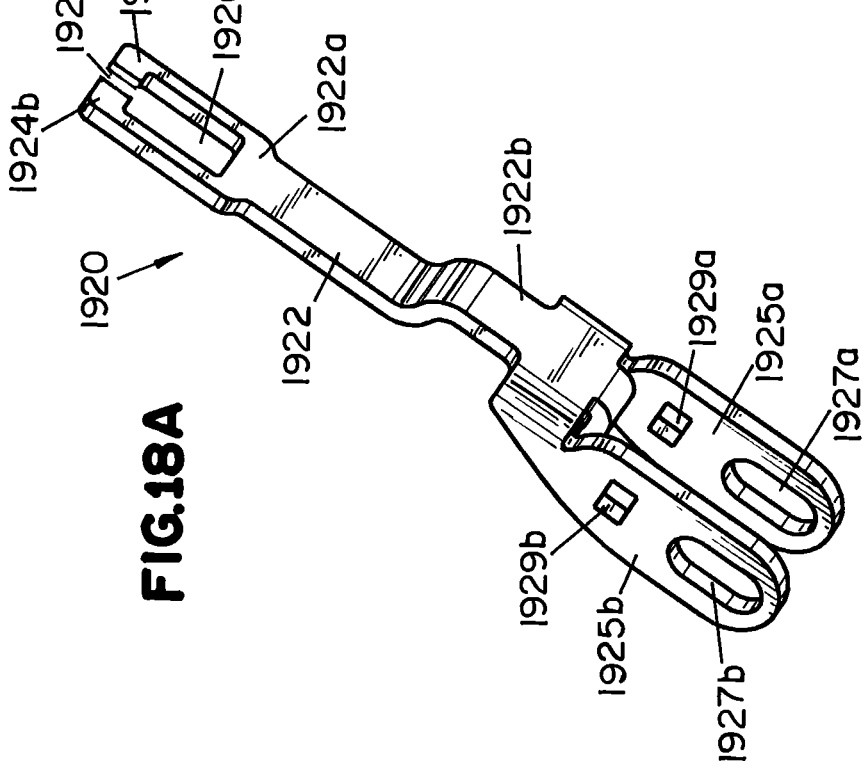

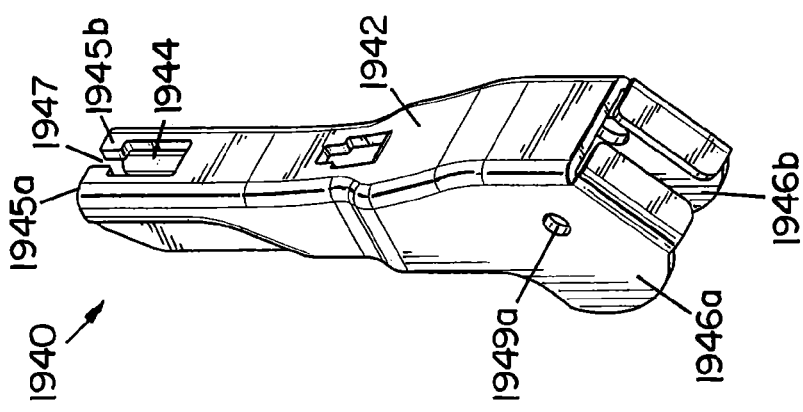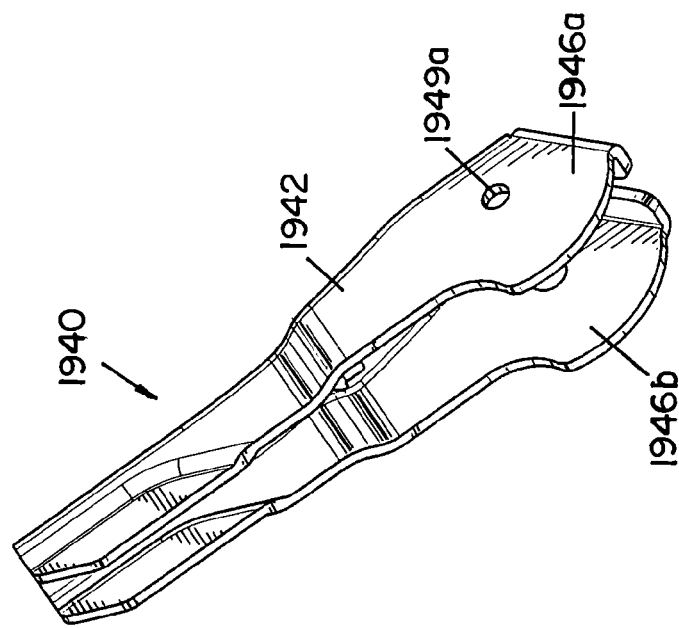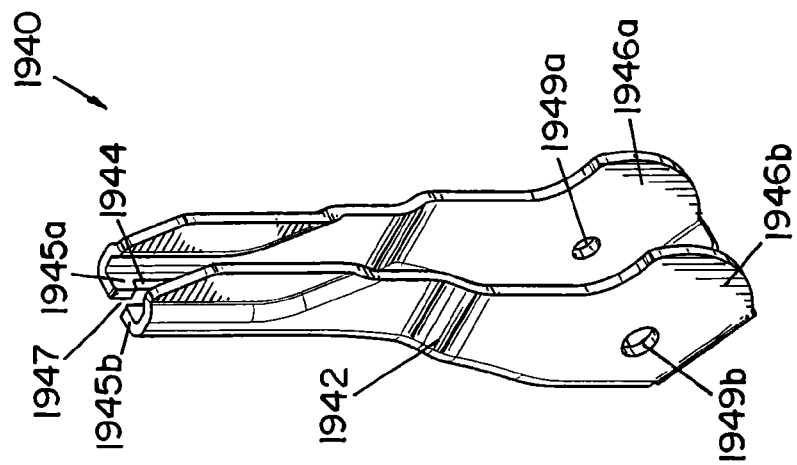

SNAP HOOK

CROSS-REFERENCE TO RELATED APPLICATIONS

This Application claims priority to and benefit of U.S. application Ser. No. 13/777,287, filed on Feb. 26, 2013, now U.S. Pat. No. 8,752,254, issued Jun. 17, 2014 and U.S. Provisional Application Ser. No. 61/604,141, filed on Feb. 28, 2012, both with the same title herewith, and both of which are incorporated in their entirety herein by reference.

BACKGROUND

Snap hooks are commonly used to connect a safety line relative to a load or a person. Typically, a closed looped end of a snap hook is secured to a safety line and a hook end is secured to a support structure. When used in this manner, tension in the safety line sets the hook against the support structure and the gate portion of the hook end is not required to carry any of the load on the safety line. It is imperative that the gate portion of the snap hook does not unintentionally open during use or a serious injury or death could occur.

For the reasons stated above and for other reasons stated below which will become apparent to those skilled in the art upon reading and understanding the present specification, there is a need in the art for a snap hook with an effective and efficient gate locking mechanism.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a snap hook including a body, a gate, a holding portion and a trigger is provided. The body has a width that is defined by an inner edge and an opposed outer edge. The body includes a generally hook shaped mid portion positioned between a nose portion and a connection portion. The nose portion terminates in a nose end. The body further has an opening to the inner edge that is positioned between the nose end and the connection portion. The nose portion includes at least one slot that extends in from the inner edge of the body. The at least one slot forms at least one wall stop and at least one catch in the nose portion. The gate is pivotally coupled proximate the connection portion of the body. The gate is configured and arranged to selectively pivot relative to the body between a closed configuration where access to the opening to the inner edge of the body is blocked by the gate and an open configuration where access through the opening to the inner edge of the body is allowed. The gate holding portion is operationally coupled to the gate. The gate holding portion is configured and arranged to be selectively received between the at least one wall stop and the at least one catch of the nose portion of the body to selectively lock the gate in the closed configuration. The trigger is pivotally coupled to the body. The trigger is further operationally coupled to move the gate holding portion to clear the at least one catch of the nose portion when activated.

In another embodiment, another snap hook is provided. The snap hook includes a body, a gate and a trigger. The body has a generally hook shaped mid portion positioned between a nose portion and a connection portion. The nose portion terminates in a nose end. The body further has an opening that is positioned between the nose end and the connection portion. The nose portion includes at least one slot that forms at least one catch. The gate has a first end that is pivotally coupled proximate the connection portion of the body and a second end that is configured and arranged to be received in the at least one slot of the nose portion of the body to selectively close the opening to the inner edge of the body. Wherein the gate is in a closed configuration when positioned across the opening and in an open configuration when the opening is at least partially unobstructed by the gate. The gate includes a gate holding portion. The gate holding portion is configured and arranged to be selectively held by the at least one catch in the nose portion to lock the gate in the closed configuration. The trigger has a first end that is pivotally coupled to the body. The trigger is operationally coupled to move the gate holding portion to clear the at least one catch when activated to unlock the gate from the nose portion of the body.

In still another embodiment, yet another snap hook is provided. The snap hook includes a body, a gate, a trigger and at least one biasing member. The body has generally a hook shaped mid portion positioned between a nose portion and a connection portion. The nose portion terminates in a nose end. The body further has an opening that is positioned between the nose end and the connection portion. The nose portion includes at least one slot that forms at least one catch. The gate has a first end that is pivotally coupled proximate the connection portion of the body and a second end that is configured and arranged to be received in the at least one slot of the nose portion of the body to selectively close the opening to the inner edge of the body. Wherein the gate is in a closed configuration when positioned across the opening and in an open configuration when the opening is at least partially unobstructed by the gate. The gate includes a gate holding portion. The gate holding portion is configured and arranged to be selectively held by the at least one catch in the nose portion to lock the gate in the closed configuration. The trigger has a first end that is pivotally coupled to the body. The trigger is operationally coupled to move the gate holding portion to clear the at least one catch when activated to unlock the gate from the nose portion of the body. The at least one biasing member is positioned to assert a biasing force to retain the gate holding portion in the nose portion of the body by the at least one catch when the gate is in the closed configuration.

BRIEF DESCRIPTION OF THE DRAWINGS

The present invention can be more easily understood and further advantages and uses thereof will be more readily apparent, when considered in view of the detailed description and the following figures in which:

FIG. 1A is a side perspective view of a snap hook of one embodiment of the present invention having its gate positioned in a closed configuration;

FIG. 1B is a side perspective view of the snap hook of FIG. 1A having its gate positioned in an opened configuration;

FIG. 5A is a back view of a gate of one embodiment of the present invention;

FIG. 5B is a side view of the gate of FIG. 5A;

FIG. 5C is a front view of the gate of FIG. 5A;

FIG. 5D is a second side view of the gate of FIG. 5A;

FIG. 6A is a first side view of a body of one embodiment of the present invention;

FIG. 6B is a second side view of the body of FIG. 6A;

FIG. 7A is a cross-sectional side view of the snap hook of FIG. 1A;

FIG. 7B is a cross-sectional side view of the snap hook of FIG. 1A with the locking member in a disengaging position;

FIG. 8A is a side view of another embodiment of a snap hook of the present invention;

FIG. 8B is a side perspective view of the snap hook of FIG. 8A;

FIG. 8C is a side perspective view of a gate of the snap hook of FIG. 8A;

FIG. 9A is a side perspective view of another snap hook of the present invention having its gate in a closed configuration;

FIG. 9B is a side perspective view of the snap hook of FIG. 9A having its gate in an open configuration;

FIG. 17 is a side perspective view of a body of the snap hook of FIG. 17;

FIG. 18A is a first side perspective view of a locking member of the snap hook of FIG. 16;

FIG. 18B is a second side perspective view of a locking member of the snap hook of FIG. 16;

FIG. 19A is a first side perspective view of a gate of the snap hook of FIG. 16;

FIG. 19B is a second side perspective view of a gate of the snap hook of FIG. 16;

FIG. 19C is a front side perspective view of a gate of the snap hook of FIG. 16.

In accordance with common practice, the various described features are not drawn to scale but are drawn to emphasize specific features relevant to the present invention. Reference characters denote like elements throughout Figures and text.

DETAILED DESCRIPTION

Figure 2:
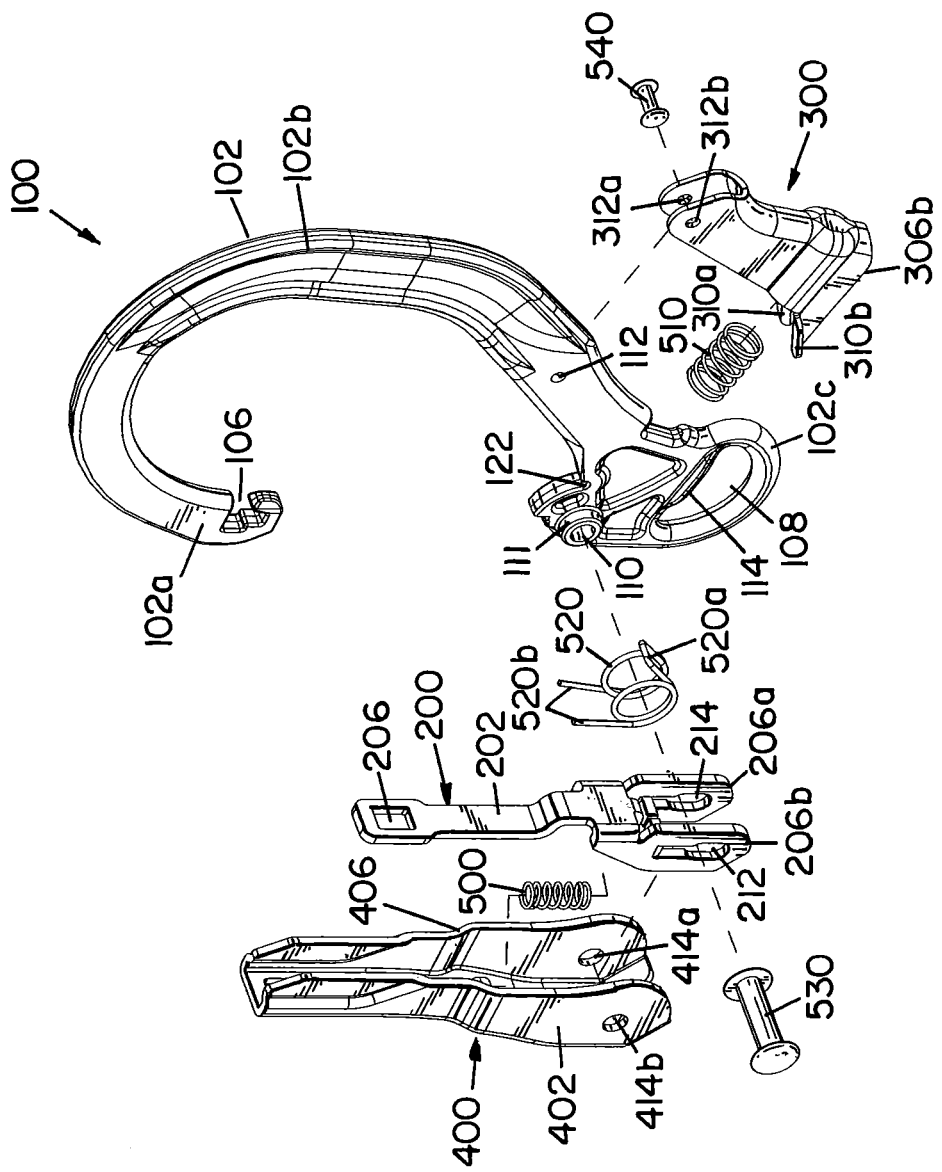
FIG. 2 is a side perspective exploded view of the snap hook of FIG. 1A.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a snap hook 100 that is easy to use. In embodiments, the gate 400 is configured to be selectively locked when in a closed configuration. Referring to FIG. 1A, a side perspective view of a snap hook 100 of one embodiment is illustrated. Snap hook 100 includes a body 102, a gate 400, a locking member 200, and a trigger 300. FIG. 1A illustrates the snap hook 100 having its gate 400 in a closed configuration. The gate 400 in an open configuration is illustrated in FIG. 1B. The elements of the snap hook 100 are further illustrated in the exploded view of FIG. 2. Besides the body 102, the gate 400, the locking member 200 and the trigger 300, snap hook 100 further includes a locking bias member 500, a gate biasing member 520, a trigger biasing member 510, a gate retaining rivet 530 and a trigger retaining rivet 540.

Figure 3D:
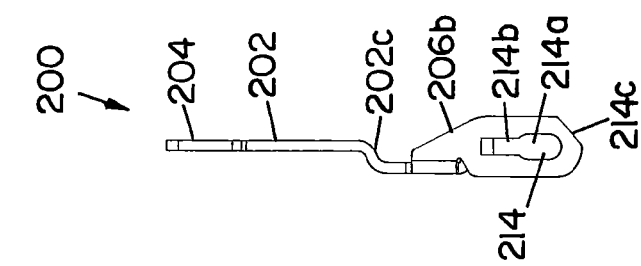
FIG. 3D is a second side view of the locking member of FIG. 3A.
Figure 3C:
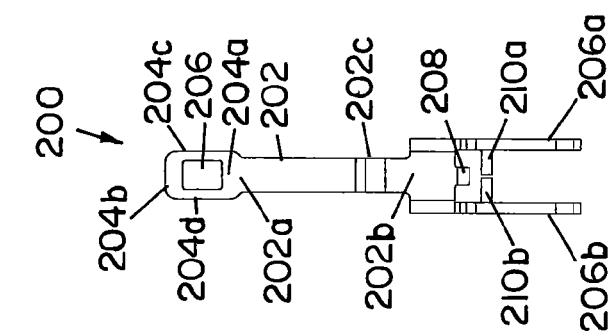
FIG. 3C is a back view of the locking member of FIG. 3A.
Figure 3B:
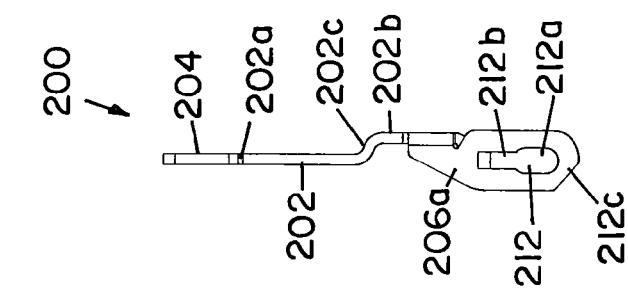
FIG. 3B is a first side view of the locking member of FIG. 3A.
Figure 3A:
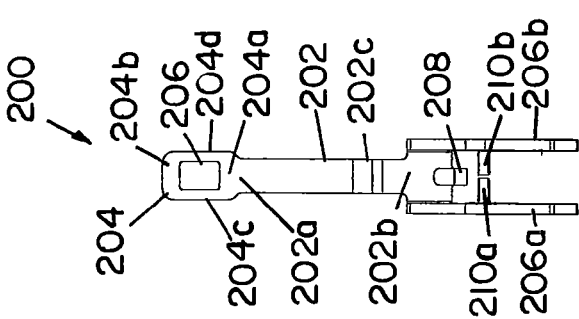
FIG. 3A is a front view of a locking member of one embodiment of the present invention.
Figure 4D:
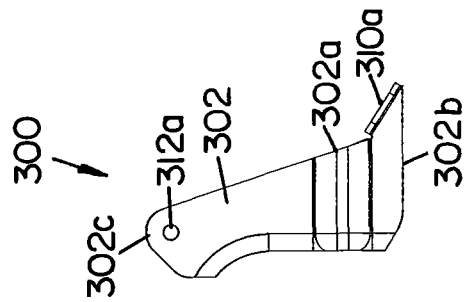
FIG. 4D is a second side view of the trigger of FIG. 4A.
Figure 4C:
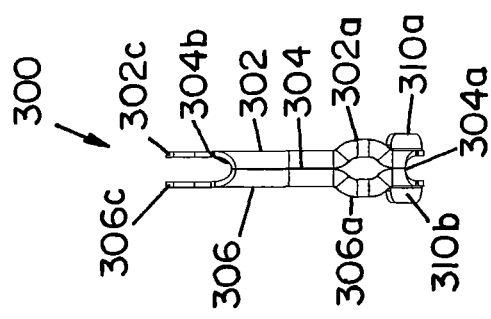
FIG. 4C is a back view of the trigger of FIG. 4A.
Figure 4B:
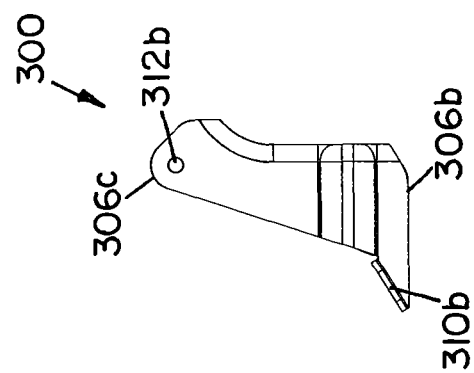
FIG. 4B is a first side view of the trigger of FIG. 4A.
Figure 4A:
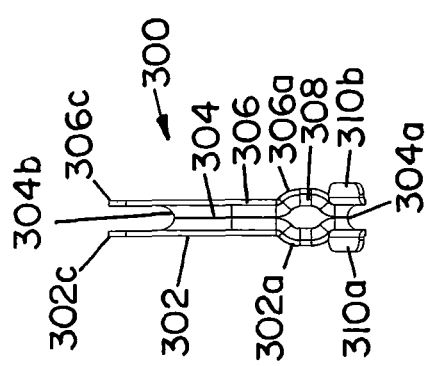
FIG. 4A is a front view of a trigger of one embodiment of the present invention.

The locking member 200 is illustrated in FIGS. 3A through 3D. The locking member includes a base 202 that has a first end 202a and a second end 202b. Extending from the first end 202a is a locking portion 204. In particular, a first portion 204a extends from the first end 202a of the base 202. Extending from the first portion 204a of the locking portion 204 are opposed side portions 204c and 204d. A holding portion 204b (holding tab) extends between the opposed side portions 204c and 204d. The first portion 204a, the side portions 204c and 204d and the holding portion 204b form a locking passage 206. The base 202 further includes a bend 202c as best seen in FIGS. 3B and 3D. The locking member 200 also includes a pair of legs 206a and 206b that extend generally perpendicular to the base 202 in an opposed fashion from the second end 202b of the base 202. Further extending from the second end 202b of the base 202 is a biasing member seat 208 designed to hold a first end of the locking biasing member 500 (as illustrated in FIGS. 7A and 7B). The biasing member seat 208 generally has a first portion that extends generally perpendicular from the base 202 and a second portion that extends generally parallel with the base 202 towards the first end 202a of the base 202. Each leg 206a and 206b further includes a respective lock stop tab 210a and 210b. Each tab 210a and 210b extends towards each other in generally a perpendicular fashion from a respective leg 206a and 206b proximate a mid portion of each respective leg 206a and 206b as illustrated in FIG. 3A and FIG. 3C. Referring to the first and second side views FIG. 3B and FIG. 3D, each leg 206a and 206b also includes a slot 212 and 214 respectively. Each slot 212 and 214 includes a first portion 212a and 214a that is generally rectangular in shape with rounded corners and a second portion 212b and 214b that extends from the first respective portion 212a and 214a that is generally rectangular in shape having a width that is less than the width of the first respective portions 212a and 214a. The slots 212 and 214 in the respective legs 206a and 206b are aligned with each other. Also illustrated in FIGS. 3B and 3D is that the respective legs 206b and 210b terminate in a rounded fashion with a respective flat portion 212c and 214c.

The trigger 300 is illustrated in FIGS. 4A through 4D. The trigger 300 includes a middle portion 304 and first and second side portions 302 and 306. The side portions 302 and 306 extend from respective side edges of the middle portion 304 in generally a perpendicular fashion. In the embodiment illustrated in FIGS. 4A through 4D, the side portions 302 and 306 are mirror images of each other having interior surfaces facing each other. Respective side edges of the middle portion 304 that form into the respective side portions 302 and 306 define a width of the middle portion 304. The middle portion further includes a first end 304a and an opposed second end 304b. The width of the middle portion 304 bulges out proximate the first end 304a of the middle portion 304 to form a trigger bias member seat 308. Correspondingly, the first side portion 302 and the second side portion 306 have curved portions 302a and 306a respectively that accommodate the bulge portion of the middle portion to form the trigger bias member seat 308. Each of the first and second side portions 302 and 306 have a length defined by respective first ends 302b and 306b and respective second ends 302c and 306c. As illustrated, the length of the first and second side portion 302 and 306 are greater than the length of the middle portion 304. Proximate the second ends 302c and 306c of the side portions 302 and 306 are aligned trigger pivot connection apertures 312a and 312b used to pivotally couple the trigger 300 to the body 102 as further discussed below. The first ends 302b and 306b of the respective first and second side portions 302 and 306 extend forward at an angle and terminate in engaging faces 310a and 310b respectively. The engaging faces 310a and 310b are configured to selectively engage and move the locking member 200 as further discussed below.

An illustration of the gate 400 is shown in FIGS. 5A through 5D. Similar to the trigger 300 discussed above the gate 400 includes a middle portion 404 and a pair of side portions 402 and 406. The side portions 402 and 406 extend from opposite edges of the middle portion 404 that define a width of the middle portion 404 in a perpendicular fashion such that inside surfaces of the side portions 402 and 406 face each other. The middle portion 404 includes a first end 404a and an opposed second end 404b that define the length of the middle portion 404. Proximate a mid-portion of the middle portion 404 is attached a gate biasing seat 411. The gate biasing seat 411 is designed to engage an end of a locking bias member 500 as further discussed below. The middle portion 404 further includes a gate passage 412 that is positioned proximate the second end 404b of the middle portion 404. A receiving portion 404c is formed between the gate passage 412 and the second end 404b of the gate 400. The receiving portion 404c is selectively received in the receiving slot 106 of the body 102 when the gate is in a closed position.

The side portions 402 and 406 of gate 400 generally mirror each other in the embodiment shown in FIGS. 5A through 5D. Each side portion 402 and 406 includes three sections in this embodiment. The first side sections 402a and 406a respectively is positioned proximate the first end 404a of the middle portion 404. The third sections 402c and 406c respectively are positioned proximate the second end 404b of the middle section 404 while second sections 402b and 406b respectively of the side portions 402 and 406 are positioned between the first and third sections 402a, 406a and 402c, 406c of the respective side portions 402 and 406. Each side portion 402 and 406 includes a width that extends from the middle portion 404 to respective side edges 402d and 406d. The middle portion 404 and side portions 402 and 406 form a gate channel 405 in which the locking member 200 is slidably received. As illustrated in FIG. 5A, a width of channel 405 is formed by middle portion 404, sections 402a, 402b and 402c of side portion 402 and sections 406a, 406b and 406c of side portion 406 is varied to accommodate the shape of the locking member 200 received in the channel 405. Moreover, the width of the channel 405 is narrowed less than a width of a corresponding portion of the locking member 200 by the third sections 402c and 406c bending in towards each other proximate the side edges 402d and 406d. This arrangement retains the locking member 200 within the channel 405 even when the gate 400 is in the open configuration.

Proximate the first end of the middle portion 404, each side portion 402 and 406 of the gate 400 has a tab 408a and 408b respectively that extends generally perpendicular from the respective side portions 402 and 406 towards each other. The tabs 408a and 408b form a gate slot 410 between each other. The slot 410 receives a portion of the connection portion 102c of the body 102. Also proximate the tabs 408a and 408b and in the first section 402a and 406a of the respective side portions 402 and 406 are aligned gate pivot connection passages 414a and 414b that are used to pivotally couple the gate 400 to the connection portion 102c of the body as further discussed below.

The body 102 is further described in view of FIGS. 6A and 6B. As discussed above the body 102 includes a mid portion 102b that is generally in a hook shaped configuration. Extending from one end of the mid portion 102b is a nose portion 102a and extending from the other end of the mid portion 102b is the connecting portion 102c. The body 102 includes an outer side edge 102e an inner side edge 102d. The nose portion 102a terminates in a nose end 102f. The nose portion 102a further includes a slot 106 that includes a receiving slot 106a that extends into the body 102 from the inner side edge 102d of the body 102 in generally a perpendicular fashion in relation to the nose end 102f. The slot 106 further includes a holding slot 106b that extends from the receiving slot 106a towards the nose end 102f in a generally perpendicular fashion in relation to the receiving slot 106a. The receiving slot 106a and the holding slot 106b form a hook portion 104 having a catch 103 in the nose portion 102a of the body 102. The body 102 further includes an opening 107 to the inner surface of the body 102 that is positioned between the nose end 102f and the connection portion 102c. The opening 107 is selectively closed when the gate 400 is in the closed configuration. The mid portion 102b of the body 102 includes a trigger pivot connection aperture 112 that is generally positioned proximate the connection portion 102c.

The connection portion 102c of the body 102 extends from an end of the mid portion 102b of the body 102. The connection portion 102c includes a connection passage 108 which allows a strap, webbing, connector, or the like, to be coupled to the body 102. In one embodiment the connection passage 108 is semi-circular (half-circular) having an arc portion 108a and a straight portion 108b. The arc portion 108a is used to connect the webbing. In this embodiment, the webbing (not shown) is tightly sewn about the arc portion 108a of the connection passage 108 so that a rotation of the webbing is limited proximately 180 degrees. This configuration reduces the possibility of the webbing rotating up into the locking mechanism causing an unintentional opening of the snap hook 100.

Along the outer side edge 102e of the body 102, proximate the connection portion 102c, is a notch 116 that forms a biasing trigger seat for a trigger biasing member 510 further discussed below. Proximate the opening 107 to the inner side 102d of the body 102, the connection portion includes a gate pivot connection aperture 110. Also proximate the opening 107 is a radially extending surface 117 that radially extends at least partially around the gate pivot connection aperture 110. Proximate a juncture between the inner side 102d of the body 102 and the radially extending surface 117 is formed a gate biasing notch 122 used to hold a gate biasing member 520 in place. The radially extending surface 117 of the connection portion further includes a radial cut out connection portion 120 that forms a locking member stop 123 at one end and a gate stop 118 at another end. In one embodiment, a hub 111 extends outward about the gate pivot connection aperture 110 to retain the gate biasing member 520 in place as further discussed below. One other feature of the connection portion 102c of the body 102 is a trigger stop ledge 114 (shown in FIGS. 1B and 2) that extends out from both sides of the body 102 proximate a portion of the connection passage 108. The trigger stop ledge 114 holds the trigger 300 in place when not activated as further discussed below.

Referring to the cross-sectional views illustrated in FIGS. 7A and 7B, as well as the exploded view of FIG. 2, further description of the assembly of the snap hook 100 is provided. The trigger 300 is pivotally attached to the body 102 via a trigger retaining rivet 540 that is passed through the trigger pivot connection apertures 312a and 312b of the trigger 300 and the trigger pivot connection aperture 112 in the body 102. The trigger biasing member 510 is positioned between the biasing trigger notch seat 116 in the body 102 and the trigger bias member seat 308 formed in the trigger 300. The trigger bias member 510 biases the trigger to an un-activation position. The trigger stop ledges 114 on the connection portion 102c of the body 102 keep the trigger 300 from rotating beyond a desired location in relation to the body 102 when in the un-activated position by engaging the respective first ends 302b and 306b of side portions 302 and 306 of the trigger 300. When the trigger 300 is in the un-activation position, no force is being asserted on the locking member 200 to counter the biasing force of the locking bias member 500. Hence, when the trigger 300 is in the un-activation position, the holding portion 204b (tab) of the locking member 200 is held in the holding slot portion 106b (second slot portion) of the slot 106 in the nose portion 102a of the main body 102 by catch 103. In FIG. 7B, trigger 300 has been depressed and is in an activation position. In the activation position, the trigger 300 asserts a force on the locking member 200 that counters the locking biasing member 500 which allows the locking member 200 to move up in relation to the main body 102 such that the holding portion 204b of the locking member 200 clears the catch 103 and the lock stop tabs 210a and 210b of the locking member 200 clear the locking member stop 123 as discussed further below. With the locking member 200 in this position, the gate 400 can be pushed in countering the gate biasing member 520 to place the snap hook 100 in the open configuration.

Also illustrated in FIG. 7A is the lock stop tab 210a that is positioned in the cutout connection portion 120 adjacent the locking member stop 123 of connection portion 102c of the body 102. This is the position of the lock stop tabs 210a and 210b of the locking member 200 when the holding portion 204b of the locking member 200 is locked in the receiving slot 106b of the nose portion 102a of the body 102. The lock stop tabs 210a and 210b engaging the locking member stop 123 provide another locking mechanism to prevent the gate 400 from unintentionally opening. Referring to FIG. 7B where the trigger 300 has been depressed, therein sliding the locking member 200 up in the gate 400, it is illustrated that the lock stop tab 210a of the locking member 200 has cleared the locking member stop 123 of the connection portion 102c of the body 102 and the holding portion 204b of the locking member 200 has cleared the catch 103 of the body 102. The gate 400 can then be opened. In the open configuration, the lock stop tabs 210a and 210b ride on the radially extending surface 117 therein keeping the locking member 200 up in an unlocking position in relation to the gate 400. Only after the gate 400 is repositioned in the closed position (or configuration) with the receiving portion 404c of the gate 400 positioned proximate an interior surface in the receiving slot 106a of the nose portion 102a of the body 102, does the lock stop tabs 210a and 210b slide down into the cutout connection portion 120 proximate the locking member stop 123 of the connection portion 102c of the body 102 via a biasing force provided by the locking bias member 500. This configuration prevents any false conveyance that the gate 400 is locked until it is properly positioned within the receiving slot 106a of the nose portion 102a of the body. Referring to FIG. 3A through 3D, the lock stop tabs 210a and 210b are illustrated as being formed by cutting and bending (punched out) connection slots 212b and 214b of the respective legs 206a and 206b of the locking member 200. That is just one method of making the lock stop tabs 210a and 210b. In another embodiment, respective aligned passages are placed in the legs 206a and 206b of the locking member 200 with a through rivet pin passing there through. In this embodiment, the rivet pin acts as the lock stop tabs 212a and 212a. In still yet another embodiment, discussed below, a holding bar 1858 is used instead of the lock stop tabs 210a and 210b.

Referring to FIGS. 8A and 8B another embodiment of the snap hook 600 is illustrated. This snap hook 600 embodiment is similar to snap hook 100 discussed above with a slightly modified geometry that streamlines the design and reduces pinch points. Snap hook 600 includes a body 102 with a nose portion 102a, a mid-portion 102b and a connection portion 102c. The snap hook 600 further includes a trigger 300 and a gate 604. The gate 604 of snap hook 600 includes an engaging surface 605. The engaging surface 605 in this embodiment includes a plurality of ridges 606 that provide a gripping surface when the gate 604 is engaged to move the gate 604 in an open configuration.

Figure 10:
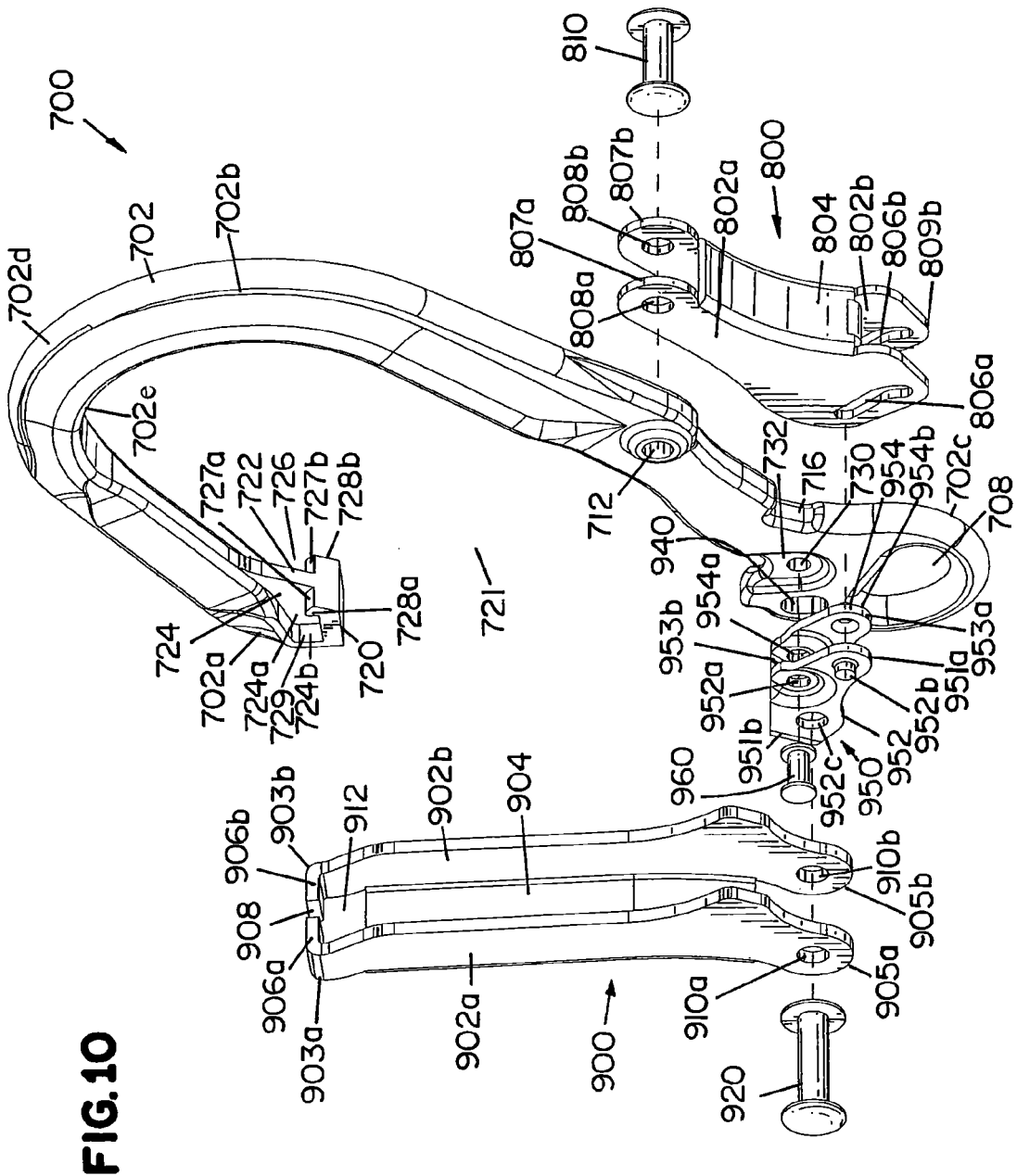
FIG. 10 is an exploded side perspective view of the snap hook of FIG. 9A.

FIGS. 9A and 9B illustrate another embodiment of a snap hook 700. In particular, FIG. 9A illustrates the snap hook 700 with its gate 900 in a closed position configuration and FIG. 9B illustrates snap hook 700 with its gate 900 in an open position configuration. Snap hook 700 of this embodiment includes a body 702 that has a nose portion 702a, a connection portion 702c and a mid-portion 702b that is positioned between the nose portion 702a and the connection portion 702c. The body includes an outer side edge 702d and an inner side edge 702e. The snap hook 700 includes an opening 721 to the inner side edge 702e of the body 702 when the gate 900 is in an open configuration. The connection portion 702c includes a connector passage 708 that is generally semi-circular in shape in this embodiment. The snap hook 700 further includes a trigger 800 that is configured to unlock gate 900 when depressed, as further discussed below. An exploded view of the snap hook 700 is illustrated in FIG. 10.

The trigger 800 includes a first side portion 802a and a second side portion 802b. The first side portion 802a is coupled to the second side portion 802b via mid activation portion 804 that is coupled along edges of the respective first and second side portions 802a and 802b. In the embodiment of FIG. 10 the first and second side portions 802a and 802b of the trigger 800 are mirror images of each other. Proximate a first end 807a of the first side panel 802a is a first connector aperture 808a. Similarly, proximate a first end 808b of the second side portion 802b is a second connector aperture 808b. The first connector aperture 808a and the second connector aperture 808b are aligned with a trigger connector aperture 712 in the main body 702 of the snap hook 700. A rivet 810 is then passed through the first connector aperture 808a, the trigger connector aperture 712 and the second connector aperture 808b to pivotally couple the trigger 800 to the main body portion 702. The first side portion 802a further includes a first activation slot 806a that is positioned proximate a second end 809a of the second side portion 802a of the trigger 800. Similarly, the second side portion 802b includes a second activation slot 806b that is positioned proximate a second end 809b of the second side portion 802b. The first activation slot 806a is aligned with the second activation slot 806b. The first and second activation slots 806a and 806b are used to selectively lock and unlock the gate 900 as further discussed below.

The gate 900 includes a first side portion 902a, a second side portion 902b and a middle engaging portion 904 that is coupled between edges of the first and second side portions 902a and 902b. In the embodiment of FIG. 10, the first and second side portions 902a and 902b are mirror images of each other. The first side portion 902a includes a first end 903a and an opposed second end 905a. The second side portion 902b includes a first end 903b and a second end 905b. A first holding tab 906a extends from the first end 903a of the first side portion 902a in generally a perpendicular fashion towards the second side portion 902b. A second holding tab 906b extends from the first end 903b of the second side portion 902b in generally a perpendicular fashion towards the first side portion 902a. A receiving gap 908 is formed by a space between termination ends of the first and second holding tabs 906a and 906b. The length of the middle engaging portion 904 is less than the lengths of the first and second side portions 902a and 902b such that a nose end receiving opening 912 is formed between a top end 904a of the middle engaging portion 904, the first and second side portions 902a and 902b adjacent the respective first ends 903a and 903b and the first and second holding tabs 906a and 906b. Each of the first and second side portions 902a and 902b further include aligned connection apertures 910a and 910b proximate the respective ends 905a and 905b of the first and second side portions 902a and 902b. A gate rivet 920 passing through the aligned connection apertures 910a and 910b pivotally couples the gate 900 to the main body 702 of the snap hook 700 as further discussed below.

Figure 11:
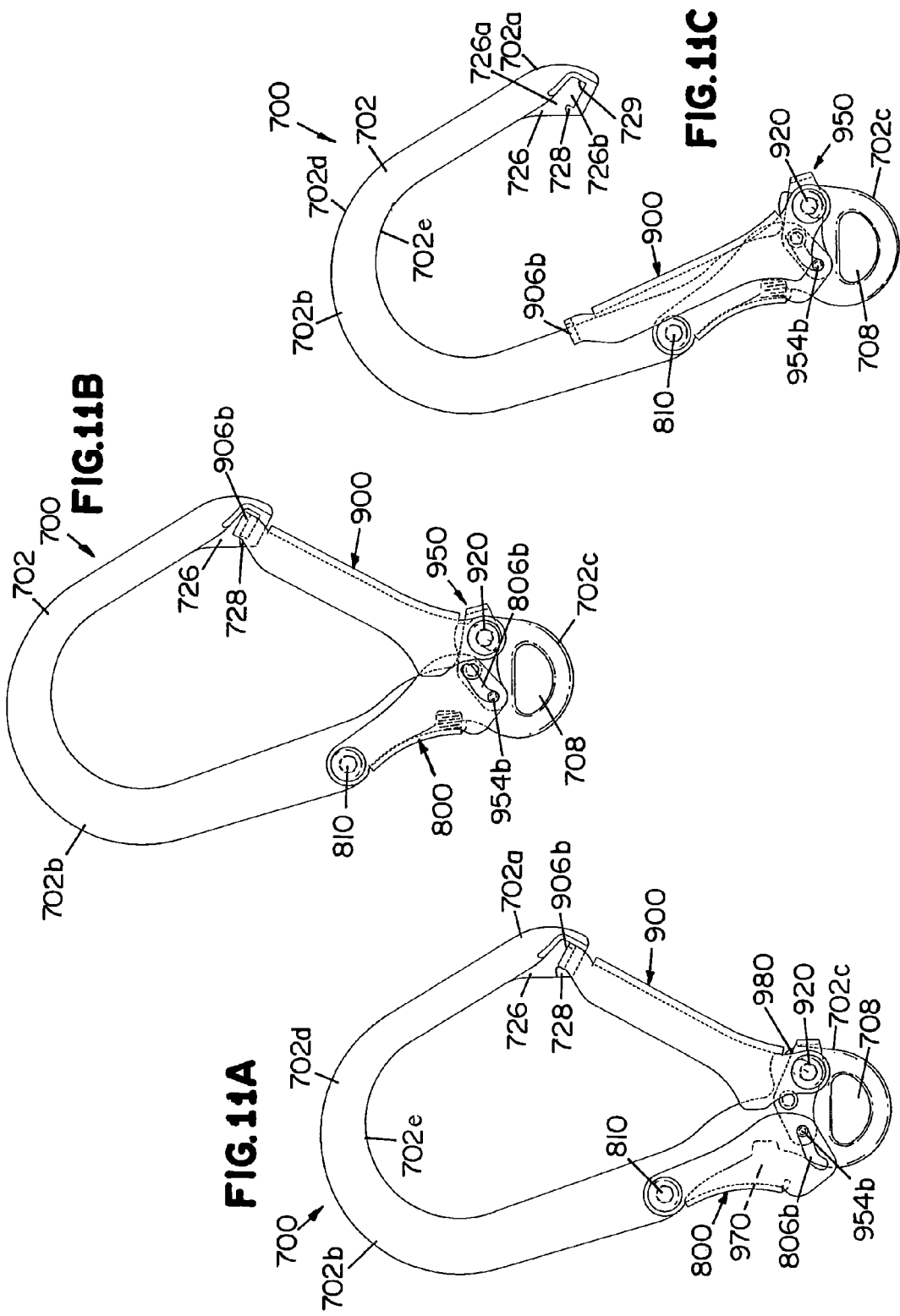
FIG. 11A is a side view of the snap hook of FIG. 9A with its gate in a closed-locked configuration.
FIG. 11B is a side view of the snap hook of FIG. 9A with its gate in a closed unlocked configuration.
FIG. 11C is a side view of the snap hook of FIG. 9A with its gate in an open configuration.

The nose portion 702a of the snap hook 700 terminates in a nose end 720. A pair of slots 724 and 726 extend inward from the inner side edge 702e of the body portion 702 proximate the nose end 720. Each slot 724 and 726 terminates in a wall stop 729. The pair of the slots 724 and 726 are separated by a central bridge portion 722. The central bridge portion 722 is designed to be selectively received in the receiving gap 908 in the gate 900 when the gate 900 is in the closed configuration. Each of the slots 724 and 726 include a first slot portion 724a and 726a respectively, that extends generally in from the inner surface 702e of the body 702 in a parallel fashion to the nose end 720 and a second slot portion 724b and 726b respectively that extends from the respective first slot portion 724a and 726a in a direction towards the nose end 720 to form catches 728a and 728b in the nose portion 702a of the main body 702 of the snap hook 700. The first and second slot portions 726a and 726b of slot 726 are shown in FIG. 11C. The holding tabs 906a and 906b of the gate 900 are configured to be selectively received in the slots 724 and 726 when the gate is in the closed configuration. Moreover, when the first and second holding tabs 906a and 906b are received in the respective second slot portions 724b and 726b of the respective slots 724 and 726, the respective catches 728a and 728b lock the gate 900 in the closed configuration as further discussed below. In the embodiment illustrated in FIG. 10, each of the catches 728a and 728b include a ramp surface 727a and 727b to aid in the slots 724 and 726 of the nose portion 702a of the main body 702 receiving the holding tabs 906a and 906b of the gate 900. The catches 728a and 728b, formed proximate the nose end 720, pass through the nose end receiving opening 912 of the gate 900 when the gate 900 is in the closed configuration.

Snap hook 700 further includes a locking member 950 that selectively locks the gate 900 in the closed configuration with the main body 702 and selectively unlocks the gate 900 from the body 702 when the gate 900 of the snap hook 700 is to be in the opening configuration. When selectively unlocking the gate 900, the locking member 950 moves the first and second holding tabs 906a and 906b of the gate 900 out of the second slot portions 724b and 726b of the slots 724 and 726 so the holding tabs 906a and 906b clear the catches 728a and 728b and the gate 900 can be moved to an open configuration. The locking member 950 is generally U-shaped having generally parallel first and second side portion 952 and 954 that are generally mirror images of each other. Each side portions 952 and 954 includes a mid fulcrum aperture 952a and 954a respectively which provides a pivot connection point to the main body 702. In particular, a fulcrum rivet 960 passing though the mid fulcrum apertures 952a and 954a of the locking member 950 and a fulcrum body aperture 730 in the body 702 proximate the connection portion of 702c of the body 702, pivotally couples the locking member 950 to the main body 702. In the embodiment of FIG. 10, the main body 702 includes a generally conical shaped recess 732 (on both sides) that leads to and surrounds the fulcrum body aperture 730. The side portions 952 and 954 include corresponding generally conically shaped inward extending areas surrounding the respective mid fulcrum apertures 952a and 954a that are designed to be rotationally received in the generally conical shaped recess 732 of the main body 702 when the mid fulcrum apertures 952a and 954a of the locking member 950 and a fulcrum body aperture 730 in the main body 702 are aligned.

The locking member 950 of the embodiment of FIG. 10, further includes a first knob 952b that extends outward from the first side portion 952 proximate a first end 951a of the first side portion 952 and a second knob 954b that extends outward from the second side portion 954 proximate a first end 953a of the second side portion 954. The first knob 952b of the first side portion 952 of the locking member 950 is received in the first activation slot 806a of the first side portion 802a of the trigger 800 and the second knob 954b of the second side portion 952 of the locking member 950 is received in the second activation slot 806b of the second side portion 802b of the trigger 800. Hence, the first and second knobs 952b and 954b of the locking member 950 ride in the respective slots 806a and 806b of the trigger 800, as the trigger 800 is moved in relation to the main body 702. The locking member 950 further includes aligned gate connection apertures 952c (only gate connection aperture 952c is illustrated in FIG. 10) in the first and second side portions 952 and 954 respectively. The aligned gate connection apertures 952c are positioned proximate second ends 951b and 953b of the respective first and second side portions 952 and 954. The aligned gate connection apertures 952c of the locking member 950 are aligned with a body slot 940 in the main body 702. The body slot 940 is also positioned proximate the connection portion 708 of the main body 702. A gate rivet 920 passing through the aligned gate connection apertures 952c of the locking member 950 and the body slot 940 in the main body 702 pivotally couple the gate 900 to the main body 702. The length of the body slot 940 allows the gate 900 to move up and down in relation to the main body 702 to allow the tabs 906a and 906b of the gate to be selectively received in the second slot portion 724b of the nose portion 702a of the main body 702 to selectively lock and unlock the gate 960.

The main body 702 further includes a bias notch 716 that is positioned proximate the connection portion 702c of the main body 702 near the trigger 800. The bias notch 716 abuts the end of a trigger biasing member 970 illustrated in FIG. 11A. FIGS. 11A through 11C illustrate the operation of the locking mechanism of snap hook 700. In FIG. 11A, the snap hook 700 is illustrated with its gate 900 in the closed-locked configuration. In this configuration, the holding tabs 906a and 906b are received in the second slot portion 724b and 726b such that the holding tabs 906a and 906b are held between the catches 728a and 728b and the wall stop 729 of the noise portion 702a of the main body 702. The trigger biasing member 970 asserts a biasing force on the trigger 800 so that the knobs 952b and 954b of the locking member 950 are positioned in the activation slots 806a and 806b of the trigger 800 in a location that causes the locking member 950 to pull the gate 900 downward to maintain the holding tabs 906a and 906b of the gate 900 between the catches 728a, 728b and the wall stop 729 of the nose portion 702a of the main body 702. In FIG. 11B, the trigger 900 is depressed countering the trigger bias member 970 to unlock the gate 900 from the main body 702. This action, moves the knobs 952b and 954b of the locking member 950 in a position in the activation slots 806a and 806b of the trigger 800 that causes the locking member 950 to pivot about the fulcrum rivet 960 connection therein pushing the gate 900 upward in relation to the nose portion 702a of the main body 702 to clear the holding tabs 906a and 906b of the gate 900 from the catches 728a and 728b of the nose portion 702a of the main body 702. A gate biasing member 980 (shown in FIG. 11A) biases the tabs 906a and 906b of the gate 900 in the slots 724 and 726 of the nose portion 702a of the main body 702 even when the tabs 906a and 906b of the gate 900 are cleared from the catches 728a and 728b of the nose portion 702a of the main body 702. FIG. 11C illustrates the gate 900 in an open configuration. This configuration is achieved once the tabs 906a and 906b of the gate 900 are cleared from the catches 728a, 728b of the nose portion 702a of the main body 702, by applying a force on the gate 900 to counter a biasing force supplied by the gate biasing member 980.

Figure 12:
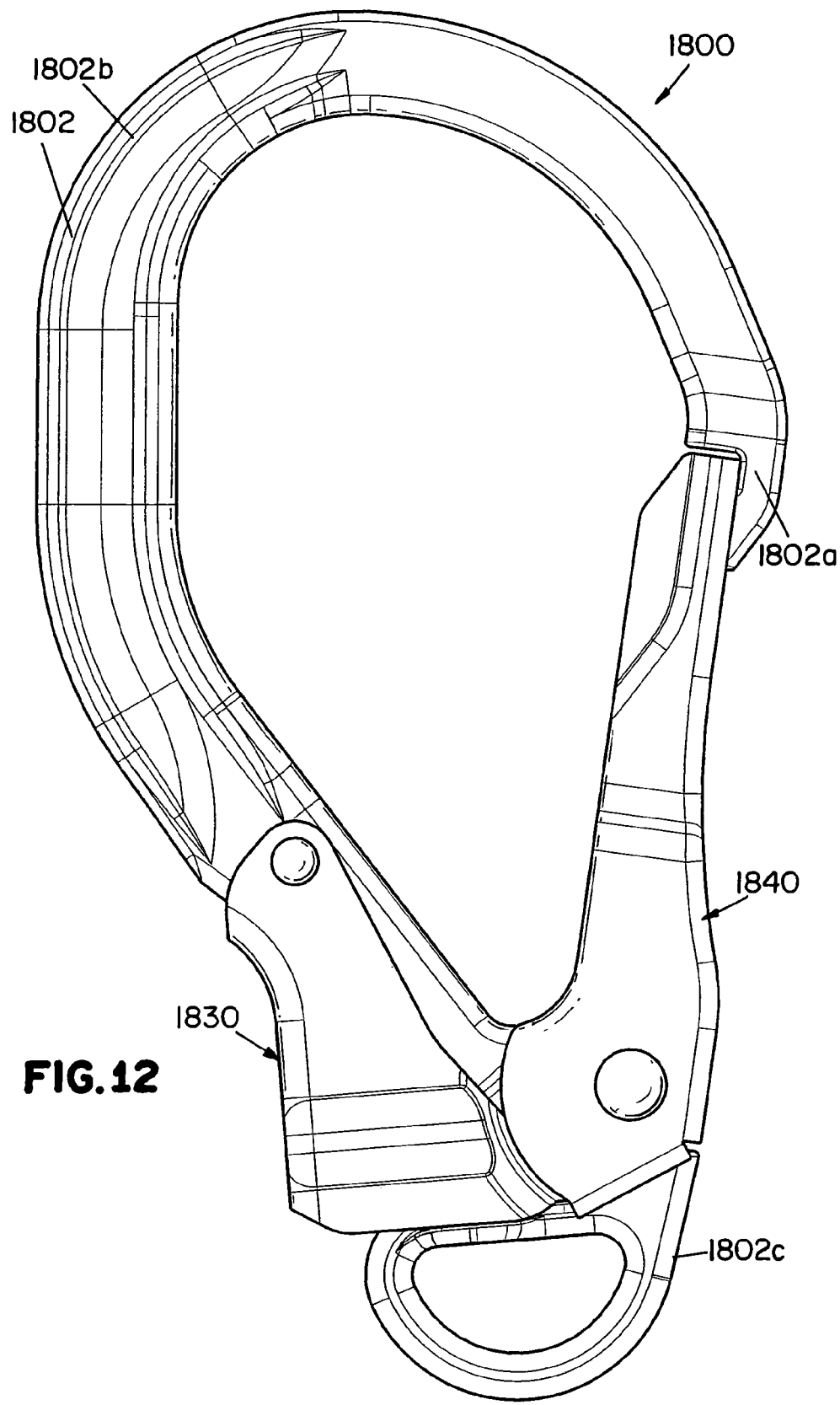
FIG. 12 is a side view of a snap hook of another embodiment of the present invention.

Another embodiment of a snap hook 1800 is illustrated in the side view of FIG. 12. Snap hook 1800 includes a body 1802, a gate 1840, a trigger 1830 and a locking member 1820 (illustrated in FIG. 13). In embodiments, the gate 1840 is configured to be selectively locked when in a closed configuration as illustrated in FIG. 12. The elements of the snap hook 1800 are further illustrated in the exploded side perspective view of FIG. 13. Besides the body 1802, the gate 1840, and the trigger 1830, snap hook 1800 further includes, a locking bias member 1870, a gate biasing member 1860, a trigger biasing member 1866, a gate retaining rivet 1864 and a trigger retaining rivet 1836.

The gate 1840 is similar to gate 400 of snap hook 100 described above. Gate 1840 includes a middle portion 1842. First and second side portions 1846a and 1846b extend from opposite sides of the middle portion 1842 to form a channel that receives the locking member 1820. The gate 1840 further includes a gate passage 1844 and a holding portion 1845. The holding portion 1845 defines a portion of the gate passage 1844. The side portions 1846a and 1846b include respective aligned gate pivot connection passages 1847a and 1847b. The gate retaining rivet 1864 passes through the aligned pivot connection passages 1847a and 1847b and a gate pivot connection aperture 1810 in the body 1802 to pivotally couple the gate 1840 to the body 1802. In this embodiment, a gate sleeve 1862 is positioned over rivet 1864. Moreover, rivet 1864 passes through the gate biasing member 1860 to help retain the gate biasing member 1860 within the channel formed by the middle portion 1842 and side portions 1846a and 1846b of the gate 1840.

The trigger 1830 is also similar to trigger 300 of snap hook 100 described above. Trigger 1830 includes a pair of opposed side portions 1832a and 1832b. The side portions 1832a and 1832b have aligned bulging portions that form a trigger bias member seat 1835. One end portion of the trigger biasing member 1866 is received within the trigger bias member seat 1835. The other end of the trigger biasing member 1866 is received within a notch 1816 of the body 1802. The side portions 1832a and 1832b further include aligned trigger pivot connection apertures 1834a and 1834b. Trigger retaining rivet 1836 passing through the aligned trigger pivot connection apertures 1834a and 1834b and a trigger pivot connection aperture 1818 in the body 1802 pivotally couples the trigger 1830 to the body 1802.

Similar to the body 102 described above, body 1802 in the embodiment of FIG. 13 includes a mid portion 1802b that is generally in a hook shaped configuration. Extending from one end of the mid portion 1802b is a nose portion 1802a and extending from the other end of the mid portion 1802b is a connecting portion 1802c. The nose portion 1802a terminates in a nose end 1804. The nose end 1804 further includes a slot 1806 that includes a receiving slot 1806a that extends into the body 1802 from an inner side edge of the body 1802 in generally a perpendicular fashion in relation to the nose end 1804. The slot 1806 further includes a holding slot 1806b that extends from the receiving slot 1806a towards the nose end 1804 in a generally perpendicular fashion in relation to the receiving slot 1806a. The receiving slot 1806a and the holding slot 1806b form a hook portion having a catch 1803 in the nose portion 1802a of the body 1802. The body 1802 further includes an opening 1801 to the inner surface of the body 1802 that is positioned between the nose end 1804 and the connection portion 1802c. The connection portion 1802c includes a connection aperture 1808. The gate 1840 is in a closed configuration when the gate is positioned across the opening 1801. The gate 1840 is in an open configuration when the opening 1801 is unobstructed by the gate 1840.

Figure 13:
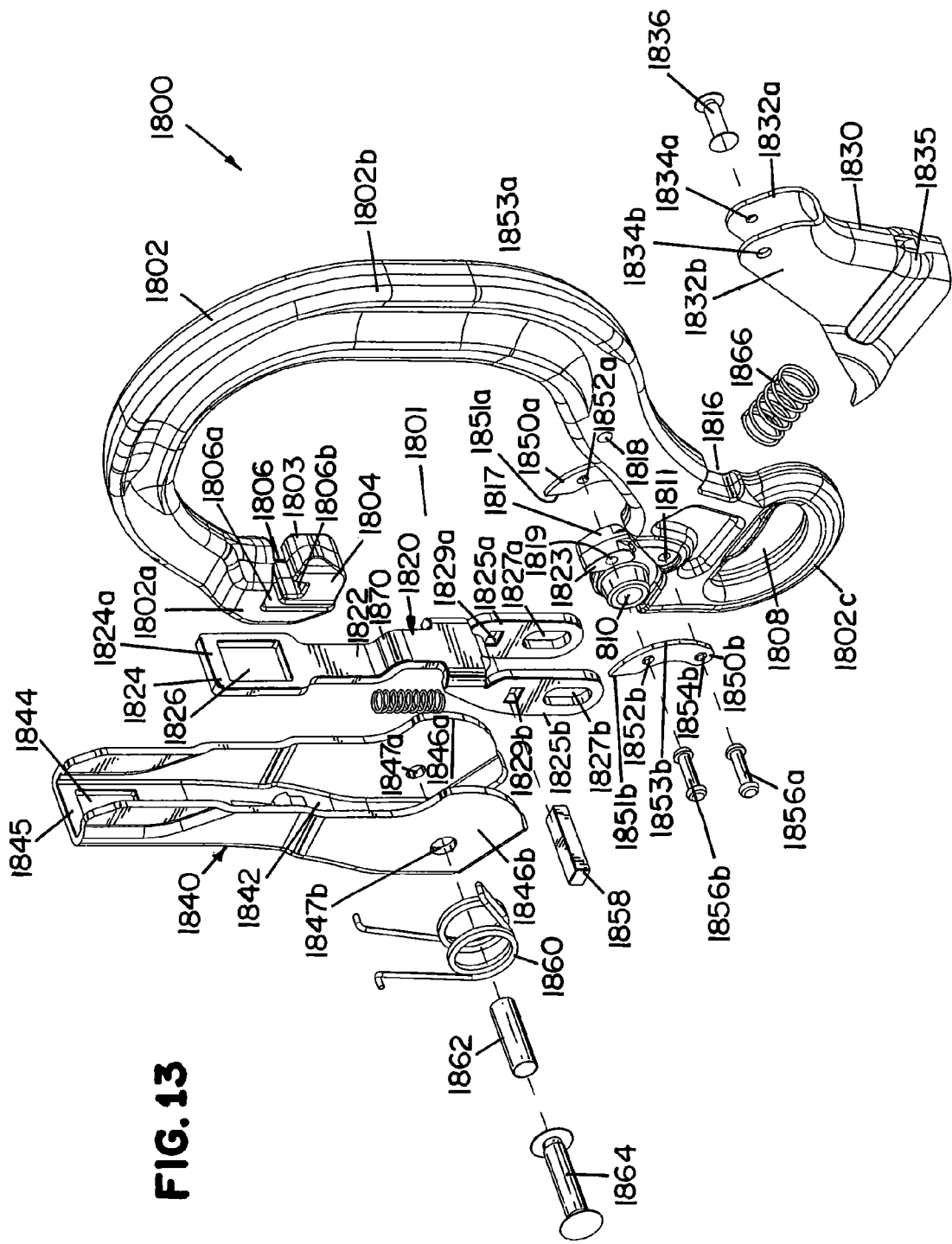
FIG. 13 is an exploded side perspective view of the snap hook of FIG. 12.

The connection portion 1802c of the body, proximate the opening 1801 to the inner side of the body 1802, includes the gate pivot connection aperture 1810. The connection portion 1802c of the body also includes a radially extending surface 1817 that radially extends at least partially around the gate pivot connection aperture 1810. Proximate a juncture between the inner side of the body 1802 and the radially extending surface 1817 is formed, a gate biasing notch used to hold a portion of the gate biasing member 1860 in place (as similarly described above in relation to gate biasing notch 122 illustrated in FIG. 2). The radially extending surface 1817 of the connection portion 1802c further includes a radial cut out connection portion that forms a locking member stop 1823. In one embodiment, a hub extends outward about the gate pivot connection aperture 1810 to retain the gate biasing member 1860 (as similarly discussed above in regards to the hub 111 of snap hook 100). In the embodiment of FIG. 13, a pair of guide plates 1850a and 1850b are mounted on either side of the radially extending surface 1817 via plate rivets 1856a and 1856b passing through aligned apertures 1854b, 1852a and 1852b in the respective guide plates 1850a and 1850b and body apertures 1811 and 1819. Guide plate 1850a will have two apertures similar to guide plate 1850b but only one aperture 1852a is shown in FIG. 13. The guide plates 1850a and 1850b further define the radially extending surface 1817 and the stop 1823. The guide plates 1850a and 1850b are used in some embodiments to prevent wear on the radially extending surface 1817 of the body 1802.

Figure 14:
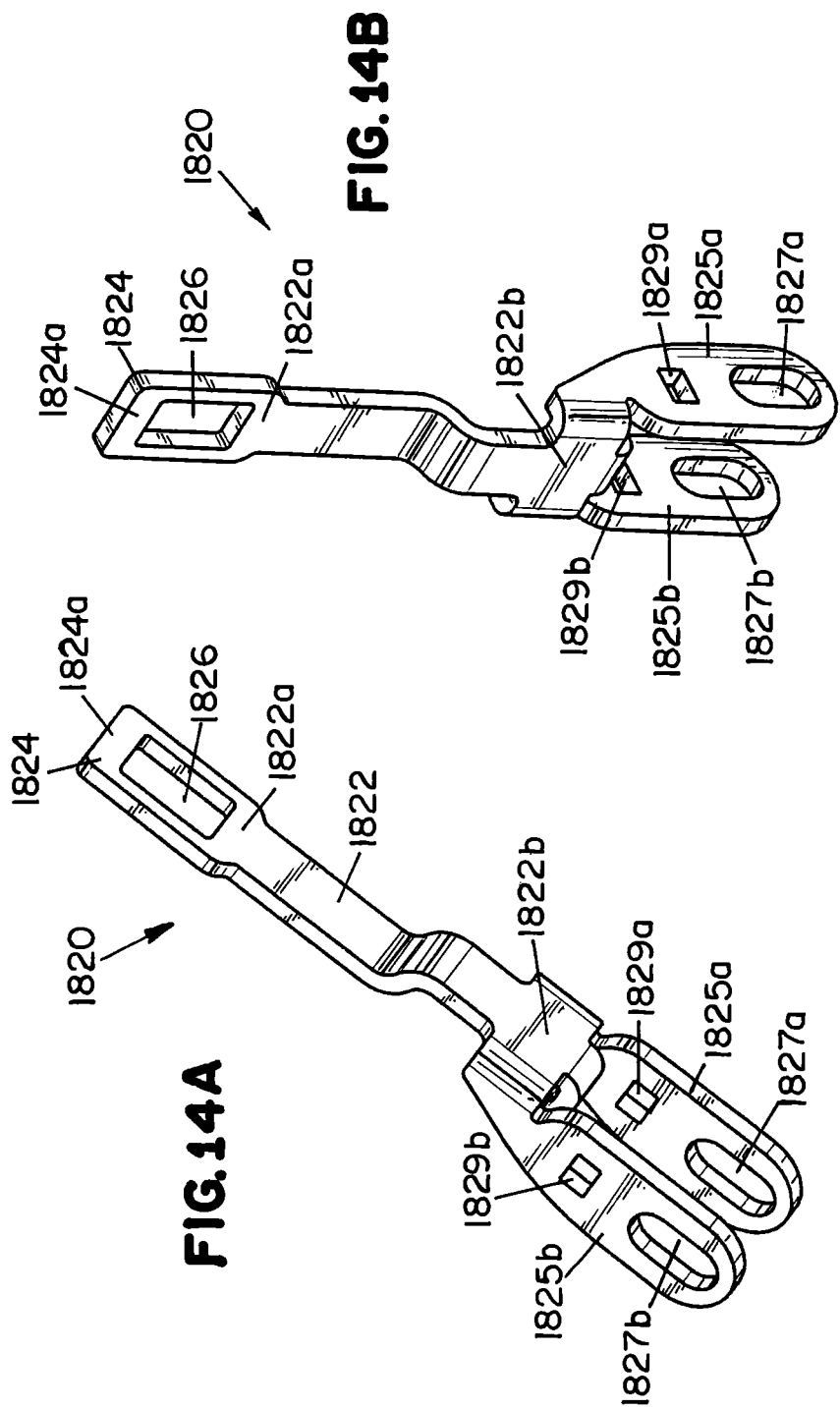
FIG. 14A is a first side perspective view of a locking member of the snap hook of FIG. 12.
FIG. 14B is a second side perspective view of the locking member of the snap hook of FIG. 12.

The locking member 1820 is further illustrated in the side views of FIGS. 14A and 14B. The locking member 1820 is similar to the locking member 200 of snap hook 100 described above. The locking member, of FIGS. 14A and 14B, includes a base 1822 that has a first end 1822a and a second end 1822b. The base 1822 includes at least one bend. Extending from the first end 1822a is a locking portion 1824. In particular, the locking portion 1824 includes a locking passage 1826 and a holding portion 1824a (holding tab) that forms a part of the locking passage 1826. The locking member 1820 also includes a pair of legs 1825a and 1825b that extend generally perpendicular to the base 1822 in an opposed fashion from the second end 1822b of the base 1822. Further extending from the second end 1822b of the base 1822 is a biasing member seat (not shown) configured to hold a first end of the locking biasing member 1870 (similar to biasing member 208 of locking member 200 described above). Each leg 1825a and 1825b also includes a slot 1827a and 1827b respectively. The slots 1827a and 1827b are aligned and in this embodiment have generally parallel sides with rounded ends. Each leg 1825a and 1825b further includes a holding bar passage 1829a and 1829b respectfully. Holding bar passage 1829a in the first leg 1825a is aligned with holding bar passage 1829b in the second leg 1825b. The holding bar passages 1829a and 1829b are located between their respective slot 1827a and 1827b and the second end 1822b of the base 1822. Referring back to FIG. 13, the gate retaining rivet 1864 passes though the slots 1827a and 1827b to slidably connect the locking member 1820 within the channel of the gate 1840. A holding bar 1858 is received in the holding bar passages 1829a and 1829b of the legs 1825a and 1825b of the locking member 1820. The holding bar 1858 provides the function of the lock stop tab 210a and 210b of locking member 200 described above. In this embodiment, the holding bar 1858, when the gate 1840 is closed, engages stop surfaces 1851a and 1851b of the guide members 1850a and 1850b that are coupled about the radially extending surface 1817 of the body 1802 to help prevent movement of gate 1840. Once the locking member 1840 is moved up with the trigger 1830, the holding bar 1858 is positioned to pass over the stop surfaces 1851a and 1851b of the guide members 1850a and 1850b and ride on radially surfaces 1853a and 1853b of the guide members 1850a and 1850b as the gate 1840 is opened.

Figure 15:
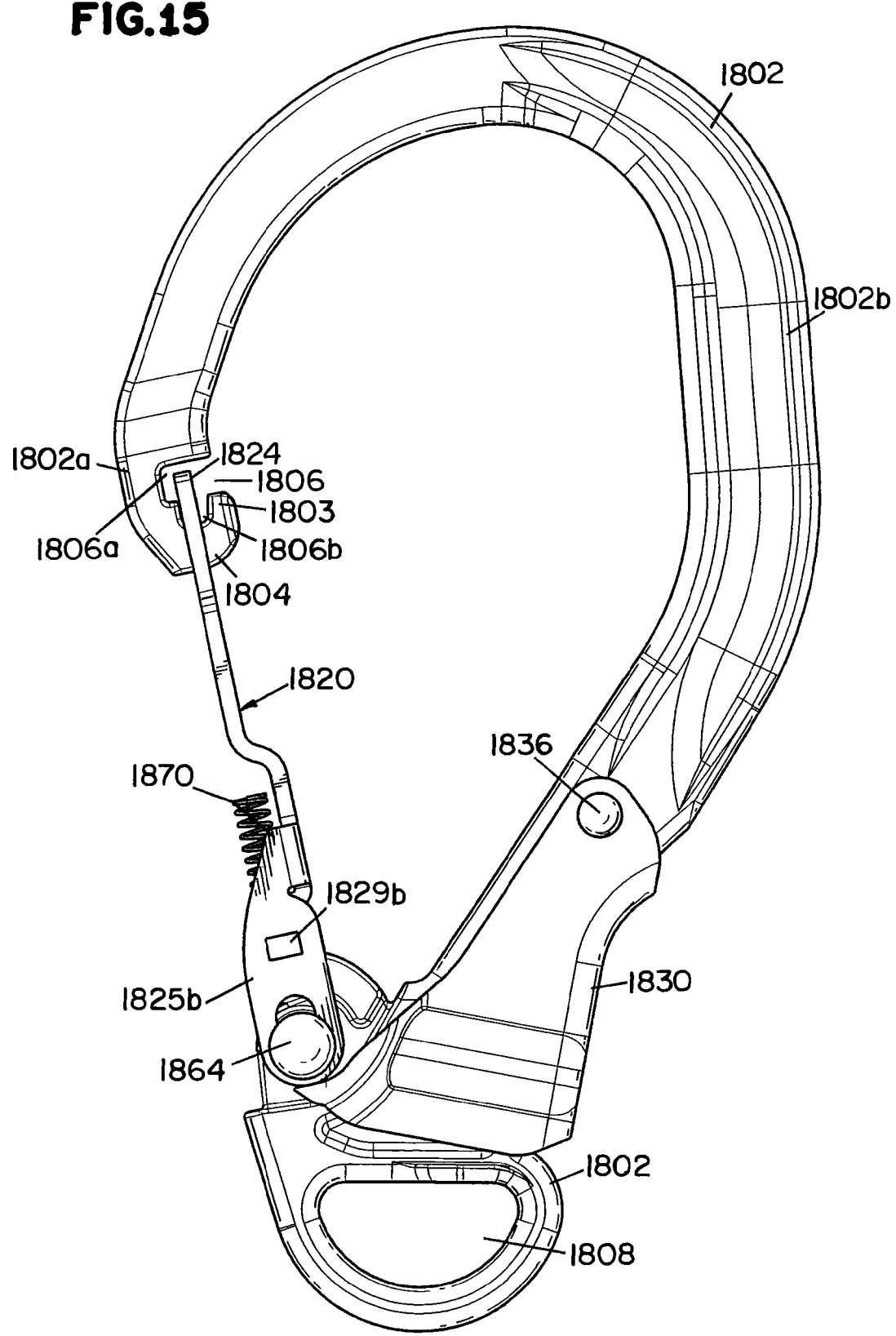
FIG. 15 is a partial side view of the snap hook of FIG. 12 illustrating the locking member engaging the body.

FIG. 15 illustrates a partial side view of the snap hook 1800. This view illustrates how the locking portion 1824 and trigger 1830 are in mechanical communication with each other. In this illustration, the trigger 1830 is depressed which lifts the locking portion 1824 of locking member 1820 out of the holding slot 1806b. In this configuration, the gate 1840 (not shown in this illustration) could be rotated into an open configuration. The locking bias member 1870 (a spring in this embodiment) biases the locking member 1820 so that the holding tab 1824a (shown in FIG. 14A) of the locking portion 1824 of the locking member 1820 is forced into the holding slot 1806b when not countered by the force of the trigger 1830 being depressed. The function of the locking biasing member 1870 is similar to the function of biasing member 500 of snap hook 100 described above in relation to FIGS. 7A and 7B. In a locked position, the stop 1823 (or stop surfaces 1851a and 1851b of guide plates 1850a and 1850b) (not shown in FIG. 15) of the radially extending surface 1817 would engage the holding bar 1858 to help prevent the gate 1840 from opening. Hence, the catch 1803 in the nose portion 1802a of the body 1802 and the stop 1823 (or stop surfaces 1851a and 1851b of guide plates 1850a and 1850b) both prevent the gate from unintentionally opening.

Figure 16:
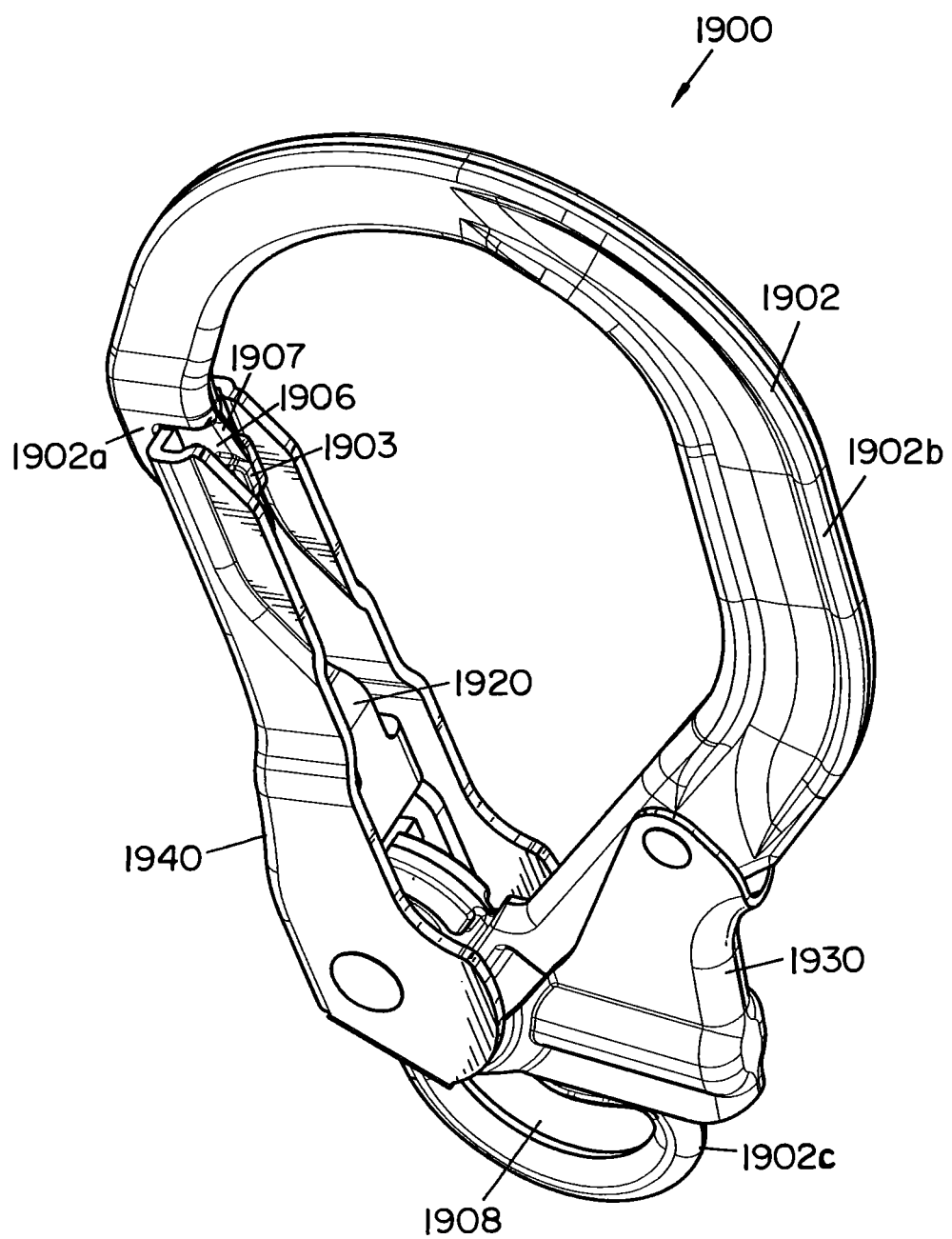
FIG. 16 is a side perspective view of another embodiment of a snap hook of the present invention.

FIG. 16 illustrates another embodiment of a snap hook 1900. This embodiment also includes a body 1902, a gate 1940, a locking member 1920 and a trigger 1930. The body 1902, as best illustrated in FIG. 17, includes a mid portion 1902b. Extending from one end of the mid portion 1902b is a nose portion 1902a and extending from the other end of the mid portion 1902b is the connecting portion 1902c. The connecting portion 1902s includes a connection passage 1908 (labeled in FIG. 16). The nose portion 1902a terminates in a nose end 1904. The nose portion 1902a, in this embodiment, includes a pair of slots 1906 and 1908 that are separated by a center bridge portion 1907. The bridge portion 1907 increases the strength of the nose portion 1902a. Slots 1906 and 1908 are mirror images of each other. Slot 1906, as shown in FIG. 17, includes a receiving slot 1906a that extends into the body 1902 from an inner side edge of the body 1902 in generally a perpendicular fashion in relation to the nose end 1904. The slot 1906 further includes a holding slot 1906b that extends from the receiving slot 1906a towards the nose end 1904 in a generally perpendicular fashion in relation to the receiving slot 1906a. The receiving slot 1906a and the holding slot 1906b form a hook portion having a catch 1903 in the nose portion 1902a of the body 1902. To accommodate the bridge portion 1907 in the nose end 1902a, the locking member 1920 and the gate 1940 are modified from the locking member 1820 and gate 1840 described above.

The locking member 1920, similar to locking member 1820, includes a base 1922 that has a first end 1922a and a second end 1922b as illustrated in FIGS. 18A and 18B. The base 1922 includes bends. Extending from the first end 1922a is a locking portion that includes a first locking portion 1924a, a second locking portion 1924b and a locking passage 1926. The first locking portion 1924a and the second locking portion 1924b (that make up the holding portion or holding tab) are spaced from each other by a lock member gap 1923. The lock member gap 1923 extends into the locking passage 1926. The locking member 1920 also includes a pair of legs 1925a and 1925b that extend generally perpendicular to the base 1922 in an opposed fashion from the second end 1922b of the base 1922. Each leg 1925a and 1925b also includes a slot 1927a and 1927b respectively. The slots 1927a and 1927b are aligned and in this embodiment have generally parallel sides with rounded ends. Each leg 1925a and 1925b further includes a holding bar passage 1929a and 1929b respectfully. Holding bar passage 1929a on leg 1925a and is aligned with holding bar passage 1929b of the second leg 1925b. The holding bar passages 1929a and 1929b are located between their respective slots 1927a and 1927b and the second end 1922b of the base 1922.

Figure 20:
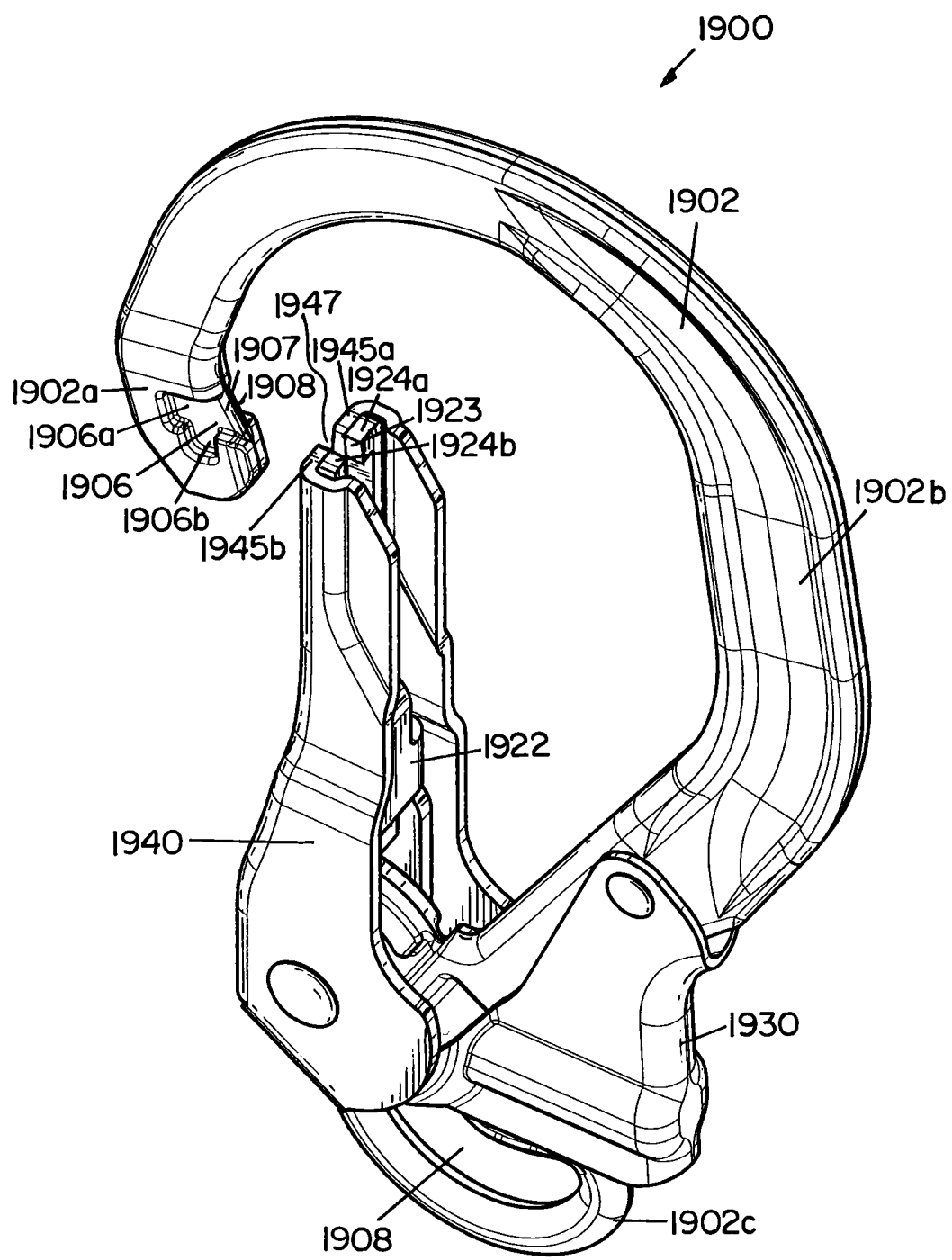
FIG. 20 is a side perspective view of the snap hook of FIG. 16 with the gate partially opened.

FIGS. 19A, 19B and 19C illustrate gate 1940 of this embodiment. Similar to gate 1840 of the above embodiment, gate 1940 includes a middle portion 1942. First and second side portions 1946a and 1946b extend from opposite sides of the middle portion 1942 to form a channel that receives the locking member 1920. The side portions 1946a and 1946b include respective aligned gate pivot connection passages 1949a and 1949b. The gate 1940 further includes a gate passage 1944 and a holding portion that, in this embodiment, includes a first holding portion 1945a and a second holding portion 1945b. The first holding portion 1945a is spaced from the second holding portion 1945b by a gate gap 1947. Referring to FIG. 20, the snap hook 1900 with the gate 1940 in an open configuration is illustrated. As illustrated, the lock member gap 1923 between the first locking portion 1924a and the second locking portion 1924b (that make up the holding portion or holding tab) of the locking member 1922 is aligned with the gate gap 1947 between the first holding portion 1945a and the second holding portion 1945b of the gate 1940. In this embodiment, when the gate 1940 moves to close, the bridge 1907 in the nose end 1902a of the body 1902 passes within the aligned gate gap 1947 of the gate 1940 and the lock member gap 1923 of the lock member 1922. Once the locking portion of the gate 1940 has been received within the slots 1906 and 1908 and the first locking portion 1924a and the second locking portion 1924b are aligned with respective holding slot 1906b (the other holding slot is not shown in FIG. 20) in each respective slot 1906 and 1908 and the holding bar (such as holding bar 1858 of the embodiment illustrated in FIG. 13) is past the respective radially extending surface (such as the radially extending surface 1817 of the embodiment illustrated in FIG. 13), a locking bias member (such as locking bias member 1870 of the embodiment illustrated in FIG. 13) forces the respective first locking portion 1924a and the second locking portion 1924b into the respective holding slot 1906b (the other holding slot is not shown in FIG. 20) therein locking the gate 1940.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention. Therefore, it is manifestly intended that this invention be limited only by the claims and the equivalents thereof.

The invention claimed is:

1. A snap hook comprising:
a body having a width defined by an inner edge and an opposed outer edge, the body including a generally hook shaped mid portion positioned between a nose portion and a connection portion, the nose portion terminating in a nose end, the body further having an opening to the inner edge that is positioned between the nose end and the connection portion, the nose portion including at least one slot extending in from the inner edge of the body, the at least one slot forming at least one wall stop and a hook portion including at least one catch;
a gate pivotally coupled proximate the connection portion of the body, the gate configured and arranged to selectively pivot in relation to the body between a closed configuration where access to the opening to the inner edge of the body is blocked by the gate and an open configuration where access through the opening to the inner edge of the body is allowed;
a gate holding portion operationally coupled to the gate, the gate holding portion being configured and arranged to be selectively received between the at least one wall stop and the at least one catch of the nose portion of the body, the catch being positioned to obstruct the gate holding portion to selectively lock the gate in the closed configuration when the gate holding portion is received between the at least one wall stop and the at least one catch; and
a trigger pivotally coupled to the body, the trigger further operationally coupled to move the gate holding portion to clear the at least one catch of the nose portion when activated.

2. The snap hook of claim 1, wherein the at least one slot includes at least a first slot portion extending in from the inner edge of the body and a second slot extending generally perpendicular from the first slot portion to form the at least one catch in the nose portion of the body.

3. The snap hook of claim 1, further comprising:
at least one biasing member positioned to assert a biasing force on the gate to bias the gate holding portion between the at least one wall stop and at least one catch.

4. The snap hook of claim 1, further comprising:
a first biasing member positioned to assert a biasing force on the gate to bias the gate holding portion in the at least one slot; and
a second biasing member positioned to assert a biasing force on the gate to bias the gate in the closed configuration.

5. The snap hook of claim 1, further comprising:
a locking member pivotally coupled to the body, the locking member being operationally coupled to the trigger, the locking member further pivotally coupled to the gate.

6. The snap hook of claim 1, further wherein the trigger is operationally coupled to move the gate towards the nose portion of the body.

7. The snap hook of claim 1, wherein the gate holding portion is part of a locking member that is operationally coupled to the gate.

8. A snap hook comprising:
a body having a generally hook shaped mid portion positioned between a nose portion and a connection portion, the nose portion terminating in a nose end, the body further having an opening positioned between the nose end and the connection portion, the nose portion including at least one slot that forms a hook portion including at least one catch;
a gate having a first end pivotally coupled proximate the connection portion of the body and a second end configured and arranged to be received in the at least one slot of the nose Portion of the body to selectively close the opening to the inner edge of the body, wherein the gate is in a closed configuration when positioned across the opening and in an open configuration when the opening is at least partially unobstructed by the gate, the gate including a gate holding portion, the gate holding portion configured and arranged to be selectively held by the at least one catch in the nose portion to lock the gate in the closed configuration, the catch being positioned to obstruct the gate holding portion when selectively locking the gate in the closed configuration; and
a trigger having a first end pivotally coupled to the body, the trigger operationally coupled to move the gate holding portion to clear the at least one catch when activated to unlock the gate from the nose portion of the body.

9. The snap hook of claim 8, further wherein the trigger is operationally coupled to move the gate towards the nose portion of the body.

10. The snap hook of claim 8, wherein the gate holding portion is part of a locking member that is operationally coupled to the gate.

11. The snap hook of claim 8, further comprising:
a locking member pivotally coupled to the body, the locking member being operationally coupled to the trigger, the locking member further pivotally coupled to the gate.

12. The snap hook of claim 8, further comprising:
at least one biasing member positioned to assert a biasing force on the gate holding portion to be held by the at least one catch in the nose portion of the body when the gate is in the closed configuration.

13. The snap hook of claim 8, further comprising:
a first biasing member positioned to assert a biasing force on the gate holding portion to be held by the at least one catch in the nose portion of the body when the gate is in the closed configuration; and a second biasing member positioned to assert a biasing force on the gate to bias the gate in the closed configuration.

14. A snap hook comprising:

a body having a generally hook shaped mid portion positioned between a nose portion and a connection portion, the nose portion terminating in a nose end, the body further having an opening positioned between the nose end and the connection portion, the nose portion including at least one slot that forms a hook portion including at least one catch;

a gate having a first end pivotally coupled proximate the connection portion of the body and a second end configured and arranged to be received in the at least one slot of the nose portion of the body to selectively close the opening to the inner edge of the body, wherein the gate is in a closed configuration when positioned across the opening and in an open configuration when the opening is at least partially unobstructed by the gate, the gate including a gate holding portion, the gate holding portion configured and arranged to be selectively held by the at least one catch in the nose portion to lock the gate in the closed configuration, the at least one catch positioned to obstruct the gate holding portion when the gate is locked in the closed configuration;

a trigger having a first end pivotally coupled to the body, the trigger operationally coupled to move the gate holding portion to clear the at least one catch when activated to unlock the gate from the nose portion of the body; and at least one biasing member positioned to assert a biasing force to retain the gate holding portion in the nose portion of the body by the at least one catch when the gate is in the closed configuration.

15. The snap hook of claim 14, further wherein the trigger is operationally coupled to move the gate towards the nose portion of the body when activated to move the gate holding portion to clear the at least one catch.

16. The snap hook of claim 14, wherein the at least one biasing member further comprises:

a first biasing member positioned to assert a biasing force on the gate to bias the holding portion in the at least one slot; and a second biasing member positioned to assert a biasing force to retain the gate holding portion in the nose portion of the body by the at least one catch when the gate is in the closed configuration.

17. The snap hook of claim 14, further comprising:

a locking member pivotally coupled to the body, the locking member being operationally coupled to the trigger, the locking member further pivotally coupled to the gate.

\* \* \* \* \*